United States Patent
Adhikary et al.

(10) Patent No.: US 9,998,250 B2
(45) Date of Patent: Jun. 12, 2018

(54) NARROWBAND MACHINE-TO-MACHINE CELL SEARCH

(71) Applicant: TELEFONAKTIEBOLAGET LM ERICSSON (PUBL), Stockholm (SE)

(72) Inventors: Ansuman Adhikary, Santa Clara, CA (US); Niklas Johansson, Uppsala (SE); Yi-Pin Eric Wang, Fremont, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 117 days.

(21) Appl. No.: 15/004,234

(22) Filed: Jan. 22, 2016

(65) Prior Publication Data

US 2016/0218821 A1 Jul. 28, 2016

Related U.S. Application Data

(60) Provisional application No. 62/108,283, filed on Jan. 27, 2015.

(51) Int. Cl.
*H04W 4/00* (2018.01)
*H04J 11/00* (2006.01)
(Continued)

(52) U.S. Cl.
CPC ........ *H04J 11/0069* (2013.01); *H04B 1/7083* (2013.01); *H04J 13/0022* (2013.01); *H04L 27/2602* (2013.01); *H04L 27/2657* (2013.01); *H04W 56/0015* (2013.01); *H04W 56/0055* (2013.01); *H04J 2011/0096* (2013.01);
(Continued)

(58) Field of Classification Search
None
See application file for complete search history.

(56) References Cited

U.S. PATENT DOCUMENTS

2006/0029017 A1* 2/2006 Mudulodu ............ H04L 5/0048
370/328
2006/0034227 A1* 2/2006 Mudulodu ............ H04B 7/068
370/334

(Continued)

OTHER PUBLICATIONS

NB M2M—Cell Search Mechanism. 3GPP GERAN #64 GP-140864. San Francisco, USA Agenda Item: 7.1.5.3.5. Source: Huawei Technologies Co., Ltd., HiSilicon Technologies Co., Ltd. Nov. 17-21, 2014.

(Continued)

*Primary Examiner* — Anh-Vu Ly

(57) ABSTRACT

A method in a wireless device is disclosed. The method comprises receiving a synchronization signal from a network node, the received synchronization signal comprising a synchronization sequence, a cell ID sequence, and a frame index indication sequence. The method further comprises estimating a time offset of the received synchronization signal using the synchronization sequence, and estimating a frequency offset of the received synchronization signal using the synchronization sequence. The method further comprises detecting a cell ID of a cell associated with the network node using the estimated time offset and the estimated frequency offset, and detecting a frame number using the estimated time offset, the estimated frequency offset, and the detected cell ID of the cell associated with the network node.

20 Claims, 12 Drawing Sheets

(51) Int. Cl.
  *H04W 56/00* (2009.01)
  *H04L 27/26* (2006.01)
  *H04B 1/7083* (2011.01)
  *H04J 13/00* (2011.01)
  *H04W 48/16* (2009.01)
(52) U.S. Cl.
  CPC ...... *H04L 27/2656* (2013.01); *H04L 27/2675* (2013.01); *H04W 48/16* (2013.01)

(56) References Cited

U.S. PATENT DOCUMENTS

| | | | | |
|---|---|---|---|---|
| 2008/0080643 | A1* | 4/2008 | Hwang | H04L 27/2647 375/316 |
| 2009/0086713 | A1* | 4/2009 | Luo | H04J 11/0073 370/350 |
| 2009/0190537 | A1* | 7/2009 | Hwang | H04L 5/0007 370/329 |
| 2010/0110873 | A1* | 5/2010 | Han | H04J 13/0062 370/208 |
| 2011/0026649 | A1* | 2/2011 | Lipka | H04L 27/2659 375/343 |
| 2011/0103534 | A1* | 5/2011 | Axmon | H04J 11/0069 375/371 |
| 2011/0249548 | A1* | 10/2011 | Gaal | H04J 13/0059 370/206 |
| 2012/0052855 | A1* | 3/2012 | Soliman | H04W 56/0025 455/422.1 |
| 2013/0230012 | A1* | 9/2013 | Lipka | H04W 48/16 370/329 |
| 2015/0024744 | A1* | 1/2015 | Yi | H04W 48/16 455/434 |
| 2015/0063095 | A1* | 3/2015 | Deng | H04W 8/005 370/221 |
| 2015/0103800 | A1* | 4/2015 | Seo | H04W 56/00 370/330 |
| 2015/0280849 | A1* | 10/2015 | Tsai | H04J 11/0076 370/328 |
| 2016/0105862 | A1* | 4/2016 | Charbit | H04L 7/027 370/336 |
| 2016/0218856 | A1* | 7/2016 | Adhikary | H04L 7/0037 370/328 |
| 2016/0219537 | A1* | 7/2016 | Adhikary | H04W 56/001 370/328 |
| 2016/0286506 | A1* | 9/2016 | Chae | H04W 56/002 370/328 |
| 2017/0156046 | A1* | 6/2017 | Deng | H04W 8/005 370/328 |

OTHER PUBLICATIONS

NB M2M—Frame Index Indication Design. 3GPP GERAN #64 GP-140861. San Francisco, USA Agenda Item: 7.1.5.3.5. Source: Huawei Technologies Co., Ltd., HiSilicon Technologies Co., Ltd. Nov. 17-21, 2014.

Vodafone. Text Proposal to Capture Agreements on Simulation Assumptions. 3GPP TSG GERAN #63 GP-140718. Agenda: 7.1.5. 3.5#. Ljubljana, Slovenia. Aug. 25-29, 2014.

NB M2M—Overview of the Physical Layer Design. 3GPP TSG GERAN #63 GP-140563. Ljubljana, Slovenia Agenda Item: 7.1.5. 3.5. Source: Huawei Technologies Co., Ltd. , HiSilicon Technologies Co., Ltd. Aug. 25-Aug. 29, 2014.

Vodafone. New Study Item on Cellular System Support for Ultra Low Complexity and Low Throughput Internet of Things. 3GPP TSG-GERAN Meeting #62 GP-140421. Valencia, Spain, rev of GP-140418 rev of GP-140411. May 26-30, 2014.

Ericsson: On NB M2M Cell Search Mechanism. 3GPP Draft; GPC150068—On NB M2M Cell Search Mechanism, 3rd Generation Partnership Project (3GPP), Mobile Competence Centre ; 650, Route Des Lucioles ; F-06921 Sophia-Antipolis Cedex; France vol. GERAN WG1, No. Sophia Antipolis, France; Feb. 2, 2015-Feb. 5, 2015 Feb. 2, 2015 (Feb. 2, 2015).

* cited by examiner

NARROWBAND MACHINE-TO-MACHINE CELL SEARCH

PRIORITY

This application claims the benefit under 35 U.S.C. § 119(e) of the priority of U.S. Provisional Application 62/108,283 filed on Jan. 27, 2015, entitled "Narrowband Mobile-to-Mobile Cell Search," the entire disclosure of which is hereby incorporated by reference.

TECHNICAL FIELD

The present disclosure relates, in general, to wireless communications and, more particularly, to narrowband mobile-to-mobile cell search.

BACKGROUND

Cellular communication systems are being developed and improved for machine type communication (MTC), communication characterized by lower demands on data rates than, for example, mobile broadband, but with higher requirements on, for example, low cost device design, better coverage, and an ability to operate for years on batteries without charging or replacing the batteries. In the 3GPP GERAN specification group, cellular communication systems are being improved and developed in the feasibility study named "Cellular System Support for Ultra Low Complexity and Low Throughput Internet of Things." GSM is being evolved, and new "clean slate" systems (systems not based on current cellular systems) are being developed.

One "clean slate" approach, called narrowband machine-to-machine (NB M2M), is a narrowband system with a carrier bandwidth of 200 kHz that targets improved coverage compared to GSM systems, long battery life, and low complexity communication design. In cellular communication systems, devices use a cell search procedure (or synchronization procedure) to understand which cell(s) to connect to. The essential functions of a cell search procedure include detecting a suitable cell to camp on, and for that cell, obtaining the symbol and frame timing and synchronizing to the carrier frequency. When synchronizing to the carrier frequency, the mobile station needs to correct any erroneous frequency offsets that are present, and perform symbol timing alignment with the frame structure from the base station. In addition, in the presence of multiple cells, the mobile station also needs to distinguish the particular cell on the basis of a cell ID, and obtain the corresponding frame number to perform frame synchronization. Thus, a typical cell search procedure consists of determining the timing alignment, correcting the frequency offset and obtaining both the correct cell ID as well as the frame ID.

When the device wakes up from deep sleep, for example from being in a power saving state, the frequency offset is to a large extent due to device clock inaccuracy (often assumed to be up to 20 ppm). The clock inaccuracy results in a drift in the timing of the sampling of the received signal. To the device receiver, this drift appears mainly as a frequency offset of the received signal, a continuous rotation of the received samples. For a system operating with 20 ppm with a carrier frequency of 900 MHz, the maximum frequency offset is 18 kHz. This offset needs to be estimated and corrected for.

The cell search procedure for NB M2M is described in GP-140864, "NB M2M—Cell Search Mechanism" and GP-140861, "NB M2M—Frame Index Indication Design."

As described in GP-140864, cell search is assumed to be performed using three sequences:

(a) Primary Synchronization Sequence (PSS): The PSS is used to determine the frame timing alignment, along with a coarse estimation of the frequency offset.

(b) Secondary Synchronization Sequence (SSS): The SSS is used to obtain a finer estimate of the frequency offset. Together with the PSS, the SSS also determines the cell ID.

(c) Frame Index Indication Signal (FIIS): The FIIS is used to determine the frame number (i.e., the ID of the current frame in the superframe). Each superframe consists of 64 consecutive frames.

Every frame consists of 960 symbols. 256 symbols are dedicated to PSS, 257 for SSS, 127 for FIIS, and the remaining 320 symbols are for carrying the broadcast information in a Broadcast Information Block (BIB).

The combination of PSS and SSS is also used to determine the ID of the particular cell after the MTC device has performed the timing and frequency synchronization. In order to achieve this functionality, three pre-defined sequences are used for PSS, and twelve are used for SSS, giving a total of thirty-six possible combinations. Each combination is used by a particular cell. This, in turn, enables the MTC device to determine the cell ID. Specifically, the MTC device first tests each of the three PSS to determine the one with the highest correlator output. This gives the frame timing. Then, the device tests each of the twelve SSS to determine the one with the highest output at the correlator to correct the frequency offset. Once the two sequences have been found, they correspond to one of the thirty-six possible combinations, which determines the cell ID. The next sequence, FIIS, is then used to obtain the frame number. This completes the cell synchronization procedure.

After switching on, an MTC device first needs to search for a signal in a viable frequency band. Signal detection is performed on the basis of comparing the amplitude of the peak from a correlation based detector with a pre-determined threshold. This is achieved by correlating the received signal with a known sequence, or a set of known sequences.

GSM uses another method for cell search. In GSM, first the frequency offset is estimated without knowledge of timing, then the time offset is estimated. This is done with signals that are specifically designed for that order of operation. Another difference is that, in GSM, the synchronization signals from different base stations use different frequency resources, which is a different way of handling multiple cells and cell IDs.

In the NB M2M cell search procedure, a physical channel named Physical Broadcast Synchronization Channel (PBSCH) is dedicated to carrying the synchronization signals, along with the broadcast system information. A separate downlink physical channel per base station is reserved for PBSCH, while the data channels are multiplexed by frequency division multiplexing (FDM). In addition, the PBSCH operates with a reuse factor of 1, implying that the PBSCH of neighboring cells are completely overlapped in the frequency domain. This has the advantage of a reduction in search complexity, but also results in interference from all the other cells using the PBSCH.

SUMMARY

To address the foregoing problems with existing approaches, disclosed is a method in a network node. The method comprises generating a synchronization signal comprising a synchronization sequence, the synchronization sequence comprising a differentially encoded base sequence comprising one of a Zadoff-Chu sequence, an m-sequence, and a gold sequence, the base sequence further comprising a symbol length and autocorrelation properties, the symbol length and autocorrelation properties configured to allow one or more wireless devices to estimate both a time offset and a frequency offset using the synchronization sequence during synchronization with the network node. The method further comprises transmitting the generated synchronization signal comprising the synchronization sequence to the one or more wireless devices.

In certain embodiments, the generated synchronization signal further comprises a cell ID sequence and a frame index indication sequence. The cell ID sequence may comprise a sequence for determining a cell ID by the one or more wireless devices, and the frame index indication sequence may comprise a sequence for determining a frame number by the one or more wireless devices. The synchronization sequence may comprise a BPSK modulated differentially encoded Zadoff-Chu sequence, the cell ID sequence may comprise a Zadoff-Chu sequence, and the frame index indication sequence may comprise a Zadoff-Chu sequence scrambled using a scrambling sequence specific for a particular cell. In certain embodiments, the synchronization sequence may have a symbol length of 410 symbols, the cell ID sequence may have a symbol length of 101 symbols, and the frame index indication sequence may have a symbol length of 127 symbols.

Also disclosed is a network node. The network node comprises one or more processors. The one or more processors are configured to generate a synchronization signal comprising a synchronization sequence, the synchronization sequence comprising a differentially encoded base sequence comprising one of a Zadoff-Chu sequence, an m-sequence, and a gold sequence, the base sequence further comprising a symbol length and autocorrelation properties, the symbol length and autocorrelation properties configured to allow one or more wireless devices to estimate both a time offset and a frequency offset using the synchronization sequence during synchronization with the network node. The one or more processors are further configured to transmit the generated synchronization signal comprising the synchronization sequence to the one or more wireless devices.

Also disclosed is a method in a wireless device. The method comprises receiving a synchronization signal from a network node, the received synchronization signal comprising a synchronization sequence, a cell ID sequence, and a frame index indication sequence, estimating a time offset of the received synchronization signal using the synchronization sequence, and estimating a frequency offset of the received synchronization signal using the synchronization sequence. The method further comprises detecting a cell ID of a cell associated with the network node using the estimated time offset and the estimated frequency offset, and detecting a frame number using the estimated time offset, the estimated frequency offset, and the detected cell ID of the cell associated with the network node.

In certain embodiments, the method may further comprise accumulating multiple frames in order to estimate the time offset with at least a first threshold level of accuracy and to estimate the frequency offset with at least a second threshold level of accuracy. Detecting the cell ID of the cell associated with the network node using the estimated time offset and the estimated frequency offset may comprise: using the time offset estimated using the synchronization sequence to locate the cell ID sequence in time; using the frequency offset estimated using the synchronization sequence to frequency correct the located cell ID sequence; and detecting the cell ID of the cell associated with the network node. Detecting the frame number using the estimated time offset, the estimated frequency offset, and the detected cell ID of the cell associated with the network node may comprise: using the time offset estimated using the synchronization sequence to locate the frame index indication sequence in time; using the frequency offset estimated using the synchronization sequence to frequency correct the located frame index indication sequence in time; descrambling the frame index indication sequence using the detected cell ID; and detecting a frame number based at least in part on the descrambled frame index indication sequence.

In certain embodiments, the synchronization sequence may comprise a differentially encoded base sequence. The base sequence may comprise one of a Zadoff-Chu sequence, an m-sequence, and a gold sequence. The synchronization sequence may comprise a BPSK modulated differentially encoded Zadoff-Chu sequence, the cell ID sequence may comprise a Zadoff-Chu sequence, and the frame index indication sequence may comprise a Zadoff-Chu sequence scrambled using a scrambling sequence specific for a particular cell. In some cases, the synchronization sequence may have a symbol length of 410 symbols, the cell ID sequence may have a symbol length of 101 symbols, and the frame index indication sequence may have a symbol length of 127 symbols.

Also disclosed is a wireless device. The wireless device comprises one or more processors. The one or more processors are configured to receive a synchronization signal from a network node, the received synchronization signal comprising a synchronization sequence, a cell ID sequence, and a frame index indication sequence. The one or more processors are further configured to estimate a time offset of the received synchronization signal using the synchronization sequence, and to estimate a frequency offset of the received synchronization signal using the synchronization sequence. The one or more processors are further configured to detect a cell ID of a cell associated with the network node using the estimated time offset and the estimated frequency offset, and to detect a frame number using the estimated time offset, the estimated frequency offset, and the detected cell ID of the cell associated with the network node.

Certain embodiments of the present disclosure may provide one or more technical advantages. For example, certain embodiments may advantageously provide faster synchronization than existing approaches for NB M2M. In some cases, this may be achieved by generating a synchronization sequence for time and frequency estimation that is a longer sequence than that used in existing approaches, which in turn results in fewer frames in the multi-frame signal accumulation needed in bad or extended coverage. Faster synchronization may advantageously result in shorter active time for the device, which increases the battery life. As another example, certain embodiments may have lower complexity than the existing NB M2M approach. This may advantageously enable a simpler implementation, which can reduce the device cost. As yet another example, certain embodiments may provide a number of cell IDs that exceeds the number of cell IDs used in GSM, and far exceeds the number of IDs provided by the existing NB M2M approach. This may advantageously enable easier reuse of GSM sites for deployment, and in general may allow more deployment flexibility. As still another example, the various embodiments can be easily extended to support more cells by extending the cell ID sequence, while the existing NB M2M approach would need more PSS and SSS sequences, which increases both complexity, in terms of number of parallel correlators, and required memory, in terms of storage space needed for multi-frame signal accumulation. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
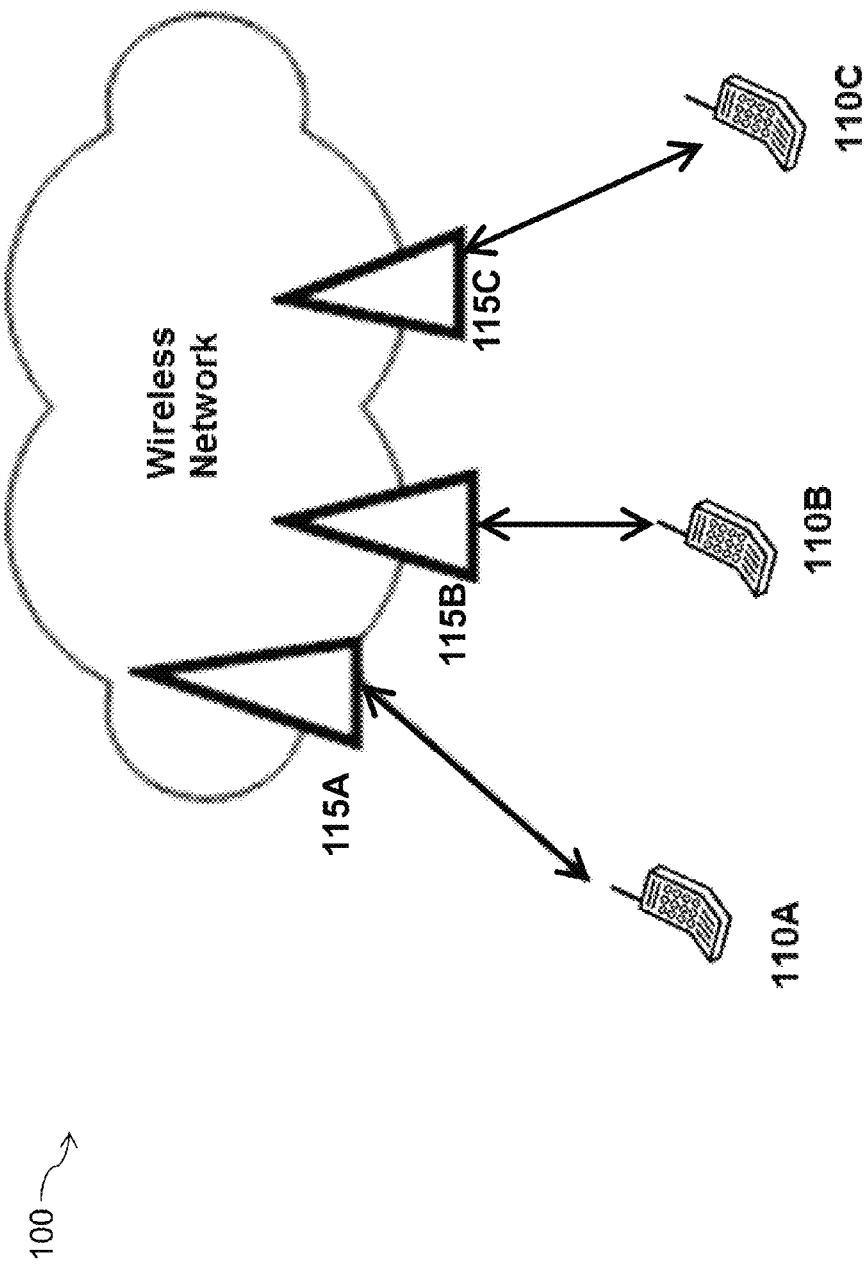
FIG. 1 is a block diagram illustrating an embodiment of a wireless communication network, in accordance with certain embodiments.

With the new MTC systems and the MTC improvements of current systems, the coverage is extended. That means that many devices will operate in bad or extended coverage with much lower received signal strength levels than before. Performing the procedures associated with cell search—in particular, estimating the time offset, the frequency offset, the cell ID, and the frame ID—becomes more difficult with weak signals. This necessitates the device to accumulate multiple frames (or multiple repetitions) of synchronization signals to gather enough energy over time to achieve good enough detection and estimation accuracy. Accumulating multiple frames means extending the time required for synchronization and cell search, which means that the device must be active for a longer period of time, which introduces a delay and reduces the battery life.

In addition, the design for NB M2M requires parallel search for and detection of three different PSS sequences, and then parallel correlation with twelve different SSS sequences, which means that three parallel PSS correlators, one for each possible sequence, and twelve parallel SSS correlators, one for each possible sequence, are needed. This introduces unnecessary complexity. Also, the NB M2M sync design only supports thirty-six different cell IDs, which puts restrictions on how the system can be deployed. Multiple cells that have strong enough signals to be detected by a device should not use the same cell ID. For example, GSM supports ninety-six cell IDs and can have a deployment that is based on utilizing all these unique IDs for proper operation, which may be a problem if the same GSM sites are used for deployment of NB M2M.

The present disclosure contemplates various embodiments that may address these and other deficiencies of existing approaches. For example, in certain embodiments a single sequence, the synchronization sequence (SS), is used. The SS may be any suitable type of signal. For example, in certain embodiments the SS may be a differentially encoded Zadoff-Chu sequence (or m-sequence, Gold sequence, or other sequence with good autocorrelation properties). The SS may be transmitted from the base station in each cell, and may be used by a wireless device (e.g., terminal or user equipment) to obtain both time offset estimation and frequency offset estimation. By using a differentially encoded sequence, the time offset estimation is robust to large frequency errors. Thus, good time offset estimation accuracy can be achieved, independent of frequency error. In certain embodiments, the SS is a known signal with unit amplitude. Thus, when the time offset has been determine, the SS may be reused for frequency offset estimation.

In bad or extended coverage, the above time and frequency estimation uses accumulation of multiple frames to achieve sufficient accuracy. By using the same signal (i.e., SS) for both time and frequency offset estimation, the sequence can be longer and still occupy the same amount of radio resources per frame (as compared to an approach that uses a separate sequence for time offset estimation, and another separate sequence for frequency offset estimation, such as NB M2M). This means that fewer frames will need to be accumulated for good estimation performance in bad or extended coverage.

In certain embodiments, the time and frequency offset estimates described above can be used to locate a cell ID signal in time, to frequency correct it, and to detect the cell ID. The cell ID signal is transmitted by the base station in each cell in each frame. In addition, in certain embodiments the time and frequency offset estimates, and the detected cell ID, can be used to locate a frame ID signal in time, to frequency correct it, to descramble it, and to detect the frame ID. The frame ID signal is transmitted in each frame from the base station, and is scrambled with the cell ID.

The various embodiments described herein may advantageously provide faster synchronization than existing approaches for NB M2M. This may be achieved by generating an SS for time and frequency estimation that is a longer signal, which in turn results in fewer frames in the multi-frame signal accumulation needed in bad or extended coverage. Faster synchronization means shorter active time for the device, which increases the battery life. Furthermore, the various embodiments have lower complexity than the existing NB M2M approach, which enables a simpler implementation, which can reduce the device cost. In addition, the various embodiments described herein may provide a number of cell IDs that exceeds the number of cell IDs used in GSM, and far exceeds the number of IDs provided by the NB M2M approach. For example, certain embodiments may provide 100 cell IDs. This may advantageously enable easier reuse of GSM sites for deployment, and in general may allow more deployment flexibility. The various embodiments can also be easily extended to support more cells by extending the cell ID sequence, while the existing NB M2M approach would need more PSS and SSS sequences, which increases both complexity, in terms of number of parallel correlators, and required memory, in terms of storage space needed for multi-frame signal accumulation.

FIG. 1 is a block diagram illustrating an embodiment of a network 100, in accordance with certain embodiments. Network 100 includes one or more UE(s) 110 (which may be interchangeably referred to as wireless devices 110, MTC UE 110, or MTC device 110), network node(s) 115 (which may be interchangeably referred to as eNodeBs (eNBs) 115). UEs 110 may communicate with network nodes 115 over a wireless interface. For example, UE 110A may transmit wireless signals to one or more of network nodes 115, and/or receive wireless signals from one or more of network nodes 115. The wireless signals may contain voice traffic, data traffic, control signals, and/or any other suitable information. In some embodiments, an area of wireless signal coverage associated with a network node 115 may be referred to as a cell. In some embodiments, UEs 110 may have device-to-device (D2D) capability. Thus, UEs 110 may be able to receive signals from and/or transmit signals directly to another UE. For example, UE 110A may be able to receive signals from and/or transmit signals to UE 110B.

In certain embodiments, network nodes 115 may interface with a radio network controller. The radio network controller may control network nodes 115 and may provide certain radio resource management functions, mobility management functions, and/or other suitable functions. In certain embodiments, the functions of the radio network controller may be included in network node 115. The radio network controller may interface with a core network node. In certain embodiments, the radio network controller may interface with the core network node via an interconnecting network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for UEs 110. UEs 110 may exchange certain signals with the core network node using the non-access stratum layer. In non-access stratum signaling, signals between UEs 110 and the core network node may be transparently passed through the radio access network. In certain embodiments, network nodes 115 may interface with one or more network nodes over an internode interface. For example, network nodes 115A and 115B may interface over an X2 interface.

As described above, example embodiments of network 100 may include one or more wireless devices 110, and one or more different types of network nodes capable of communicating (directly or indirectly) with wireless devices 110.

In some embodiments, the non-limiting term UE is used. UEs 110 described herein can be any type of wireless device capable of communicating with network nodes 115 or another UE over radio signals. UE 110 may also be a radio communication device, target device, D2D UE, machine-type-communication UE or UE capable of machine to machine communication (M2M), low-cost and/or low-complexity UE, a sensor equipped with UE, Tablet, mobile terminals, smart phone, laptop embedded equipped (LEE), laptop mounted equipment (LME), USB dongles, Customer Premises Equipment (CPE), etc. UE 110 may operate under either normal coverage or enhanced coverage with respect to its serving cell. The enhanced coverage may be interchangeably referred to as extended coverage. UE 110 may also operate in a plurality of coverage levels (e.g., normal coverage, enhanced coverage level 1, enhanced coverage level 2, enhanced coverage level 3 and so on).

Also, in some embodiments generic terminology, "radio network node" (or simply "network node") is used. It can be any kind of network node, which may comprise a base station (BS), radio base station, Node B, base station (BS), multi-standard radio (MSR) radio node such as MSR BS, evolved Node B (eNB), network controller, radio network controller (RNC), base station controller (BSC), relay node, relay donor node controlling relay, base transceiver station (BTS), access point (AP), radio access point, transmission points, transmission nodes, Remote Radio Unit (RRU), Remote Radio Head (RRH), nodes in distributed antenna system (DAS), Multi-cell/multicast Coordination Entity (MCE), core network node (e.g., MSC, MME etc), O&M, OSS, SON, positioning node (e.g., E-SMLC), MDT, or any suitable network node.

The terminology such as network node and UE should be considered non-limiting and does in particular not imply a certain hierarchical relation between the two; in general "eNodeB" could be considered as device 1 and "UE" device 2, and these two devices communicate with each other over some radio channel.

A network node is an even more general term, which may be a radio network node or a core network node (e.g., TCE, MME, MDT node, MBMS node) or even an external node (e.g., $3^{rd}$ party node, a node external to the current network). Note that any radio network node is a network node, but not any network node is a radio network node. Herein, the first and the second network nodes may be comprised in the same or different physical nodes. In some cases, when the first and the second nodes are comprised in the same physical node (e.g., the same base station or the same core network node), the first node may be for example a logical entity associated with or controlling a first cell, and the second node may be for example a logical entity associated with or controlling a second cell. The term "radio node" used herein may be used to denote a UE or a radio network node.

Example embodiments of UE 110, network nodes 115, and other network nodes (such as radio network controller or core network node) are described in more detail below with respect to FIGS. 7-11.

Although FIG. 1 illustrates a particular arrangement of network 100, the present disclosure contemplates that the various embodiments described herein may be applied to a variety of networks having any suitable configuration. For example, network 100 may include any suitable number of UEs 110 and network nodes 115, as well as any additional elements suitable to support communication between UEs or between a UE and another communication device (such as a landline telephone). Furthermore, although certain embodiments may be described as implemented in a Long Term Evolution (LTE) network, the embodiments may be implemented in any appropriate type of telecommunication system supporting any suitable communication standards and using any suitable components, and are applicable to any radio access technology (RAT) or multi-RAT systems in which the UE receives and/or transmits signals (e.g., data). For example, the various embodiments described herein may be applicable to LTE, LTE-Advanced, UMTS, HSPA, GSM, cdma2000, WiMax, WiFi, another suitable radio access technology, or any suitable combination of one or more radio access technologies. Although certain embodiments may be described in the context of wireless transmissions in the downlink, the present disclosure contemplates that the various embodiments are equally applicable in the uplink.

In certain embodiments, the cell synchronization procedure includes three sequences: the SS, the Cell ID Sequence (CIS), and the Frame Index Indication Sequence (FIIS). With respect to the synchronization sequence, instead of using separate sequences for determining frame timing as well as frequency offset, a single sequence is used for both the frame timing estimation and frequency offset correction. The CIS is separate sequence, and is used to determine the cell ID. The FIIS is a third sequence reserved to determine the frame number.

As described above, in certain embodiments network node 115 may generate a synchronization signal that includes the SS, the CIS, and the FIIS. The SS may comprise a differentially encoded base sequence comprising a symbol length and autocorrelation properties. The symbol length and autocorrelation properties may be configured to allow one or more wireless devices to estimate both a time offset and a frequency offset using the synchronization signal during synchronization with network node 115. Network node 115 may transmit the generated synchronization signal to the one or more wireless devices.

In certain embodiments, wireless device 110 may receive the synchronization signal transmitted by network node 115. Wireless device 110 may estimate a time offset of the received signal using the SS. Wireless device 110 may also estimate a frequency offset of the received signal using the SS. In some cases, wireless device 110 may accumulate multiple frames in order to estimate the time offset with at least a first threshold level of accuracy, and to estimate the frequency offset with at least a second threshold level of accuracy.

Figure 2:
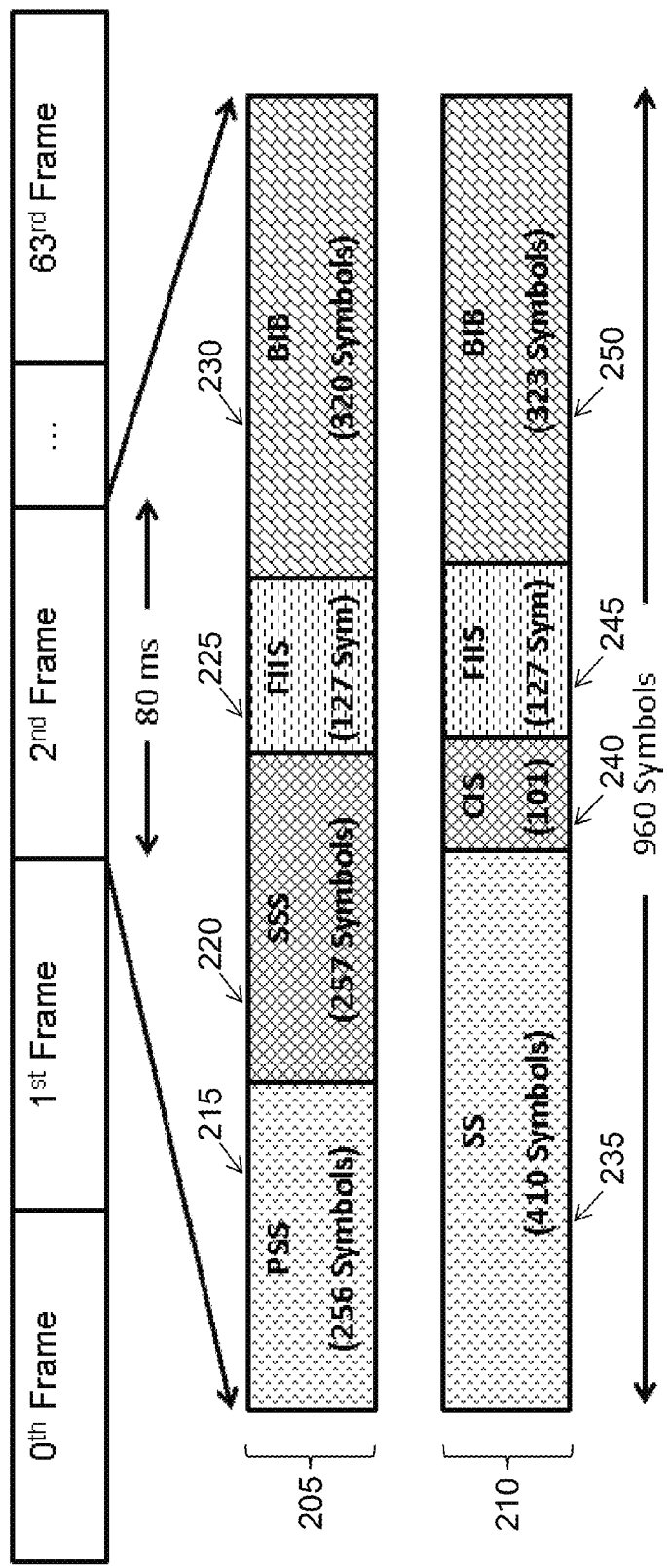
FIG. 2 illustrates a frame structure for PBSCH, in accordance with certain embodiments.

FIG. 2 illustrates a proposed frame structure for PBSCH, in accordance with certain embodiments. More particularly, FIG. 2 illustrates the frame structure of existing approaches 205 in comparison with the proposed frame structure of PBSCH 210. The frame structure of existing approaches 205 includes PSS 215, SSS 220, FIIS 225, and BIB 230. As shown in FIG. 2, PSS 215 has a length of 256 symbols, SSS 220 has a length of 257 symbols, FIIS 225 has a length of 127 symbols, and BIB 230 has a length of 320 symbols.

In comparison, the proposed frame structure of PBSCH 210 includes SS 235, CIS 240, FIIS 245, and BIB 250. In the example embodiment illustrated in FIG. 2, SS 235 has a length of 410 symbols, CIS 240 has a length of 101 symbols, and FIIS 245 has a length of 127 symbols. The remaining 322 symbols of BIB 250 are used for carrying the broadcast information, making the total number of symbols in the frame equal to 960. Other embodiments may have SS, CIS, and FIIS sequences of different symbol lengths. In some cases, the symbol length of the various sequences may vary according to particular implementations. For example, the length of CIS 240 may be increased in cases where more cell IDs may be desirable.

In certain embodiments, an MTC device, such as wireless device 110, first obtains the frame timing using SS 235, and then uses SS 235 for determining the frequency offset. After the frame timing is found and frequency offset corrected, CIS 240 may be used to determine the cell ID. After the cell ID is determined, FIIS 245 indicates the frame number.

SS 235 may be designed in any suitable manner, and the design of SS 235 may vary according to particular implementations. The SS may be created by differentially encoding a base sequence that has suitable auto-correlation properties. For example, low autocorrelation for non-zero lag, and a high correlation for zero lag. Depending on the scenario, some possibilities include a Zadoff-Chu sequence, an m-sequence, a Gold sequence, or other sequence with suitable correlation properties. By using a differentially encoded sequence, the time offset estimation is robust to large frequency errors. Thus, good time offset estimation accuracy can be achieved, independent of frequency error. When the time offset has been determined, the same SS is reused for frequency offset estimation. Since the SS is a known signal with unit amplitude, the sequence is easily reused for frequency offset estimation.

In one example embodiment, SS 235 is a length 410 BPSK modulated differentially encoded Zadoff-Chu sequence of length 409, and is defined as:

$$\tilde{S}(n+1) = \tilde{d}(n)\tilde{S}(n)$$
$$\tilde{d}(n) = e^{-j\pi \frac{n(n+1)}{409}}, S(0) = 1 \; n = 1, 2, \ldots, 409$$

In certain embodiments, a longer length is used than for PSS 215 in the frame structure of existing approaches 205. This may advantageously reduce the number of frames that need to be accumulated for sufficient estimation accuracy in low signal-to-noise ratio (SNR) (i.e., bad coverage), enabling a shorter synchronization time while at the same time allowing the new cell search solution to use no more symbols than are used in the existing design. In such an example embodiment, the exact length of 409 is chosen because it is a prime number, and Zadoff-Chu sequences with prime number lengths have good autocorrelation properties. Any other suitable lengths may be used.

CIS 240 may be designed in any suitable manner, and the design of CIS 240 may vary according to particular implementations. For example, in one example embodiment CIS 240 for the $k^{th}$ cell is a length-101 Zadoff-Chu sequence, given as:

$$\tilde{c}_k(n) = e^{-jk\pi \frac{n(n+1)}{101}} \; n = 0, 1, 2, \ldots, 100$$

Using Zadoff-Chu sequences for both SS 235 and CIS 240 provides the flexibility and advantage to design two Zadoff-Chu sequences with prime number lengths, such that the total length is comparable to the combined length of the PSS and SSS in the frame structure of existing approaches 205. It should be noted, however, that in alternative embodiments other sequences than Zadoff-Chu can be used for SS 235, for CIS 240, and for FIIS 245. For example, in certain embodiments m-sequences, Gold sequences, or other sequences with suitable correlation properties may be used. Suitable correlation properties may include low autocorrelation at non-zero correlation lag, and high autocorrelation at zero lag, and low cross-correlation between different sequences used for the same purpose (e.g., different CIS corresponding to different cells).

In certain embodiments, the time and frequency offset estimates may be used to locate a cell ID signal time, to frequency correct it, and to detect the cell ID. CIS 240 may be transmitted by the base station in each cell in each frame.

In addition, the time and frequency offset estimates, and the detected cell ID, may be used to locate a frame ID signal in time, to frequency correct it, to descramble it, and to detect the frame ID. FIIS 245 is transmitted in each frame from the base station, and is scrambled with the cell ID.

FIIS 245 may be designed in any suitable manner, and the design of FIIS 245 may vary according to particular implementations. In one example embodiment, the frame index indication sequence $\tilde{f}_c^m(n)$ for the $m^{th}$ frame in the $c^{th}$ cell is a length-127 scrambled Zadoff-Chu sequence, where the scrambling sequence is specific for a particular cell. This is given by:

$$\tilde{f}_c^m(n) = \tilde{e}_m(n) G_c(n),$$

where m indicates the frame number, $\tilde{e}_m(n)$ is generated as $$\tilde{e}_m(n) = e^{-jm\pi \frac{n(n+1)}{127}} \quad n = 0, 1, 2, \ldots, 126$$

and $G_c(n)$ denotes the BPSK modulated sequence $g_c(n)$ generated as $$g_c(n) = x(n+N_G) \oplus y_c(n+N_G)$$

$$x(n+31) = x(n+3) \oplus x(n)$$

$$y_c(n+31) = y_c(n+3) \oplus y_c(n+2) \oplus y_c(n+1) \oplus y_c(n)$$

with $N_G = 1600$, $x(0)=1$, $x(n)=0$, $n=1, 2, \ldots, 30$ and $y_c(n)$ initialized as $$c = \sum_{m=0}^{30} y(m) 2^m, \quad c = 1, 2, \ldots, 100$$

Figure 3:
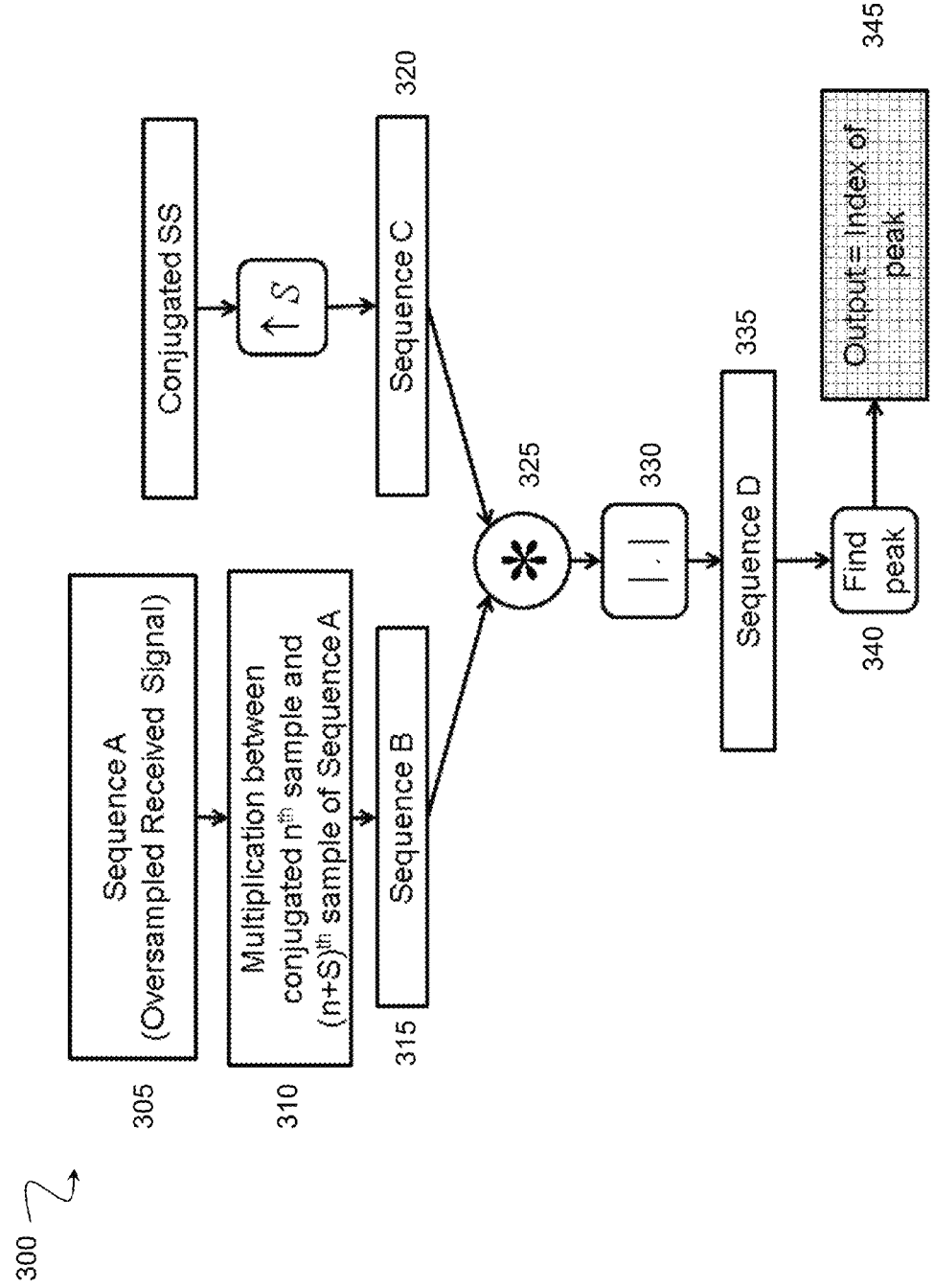
FIG. 3 is a flow diagram of a receiver algorithm for time offset estimation, in accordance with certain embodiments.

FIG. 3 is a flow diagram of a receiver algorithm 300 for time offset estimation, in accordance with certain embodiments. In certain embodiments, the time offset may be estimated using the algorithm illustrated in FIG. 3. At block 305, the received signal is sampled with an oversampling factor of S to generate Sequence A. This is followed at block 310 by a differential decoding, that is, a conjugate multiplication between the adjacent symbols corresponding to the $n^{th}$ and $(n+S)^{th}$ samples of Sequence A to generate Sequence B at block 315. At block 320, Sequence C is obtained by up-sampling the conjugated synchronization sequence by a factor of S. At block 325, a sliding cross correlation is first applied between Sequence B of block 315 and Sequence C of block 320, and Sequence D is generated at block 335 by taking the absolute values (magnitude) of the resulting entries at block 330. The output of the algorithm at block 345 corresponds to the index of the maximum value of Sequence D determined at block 340.

Figure 4:
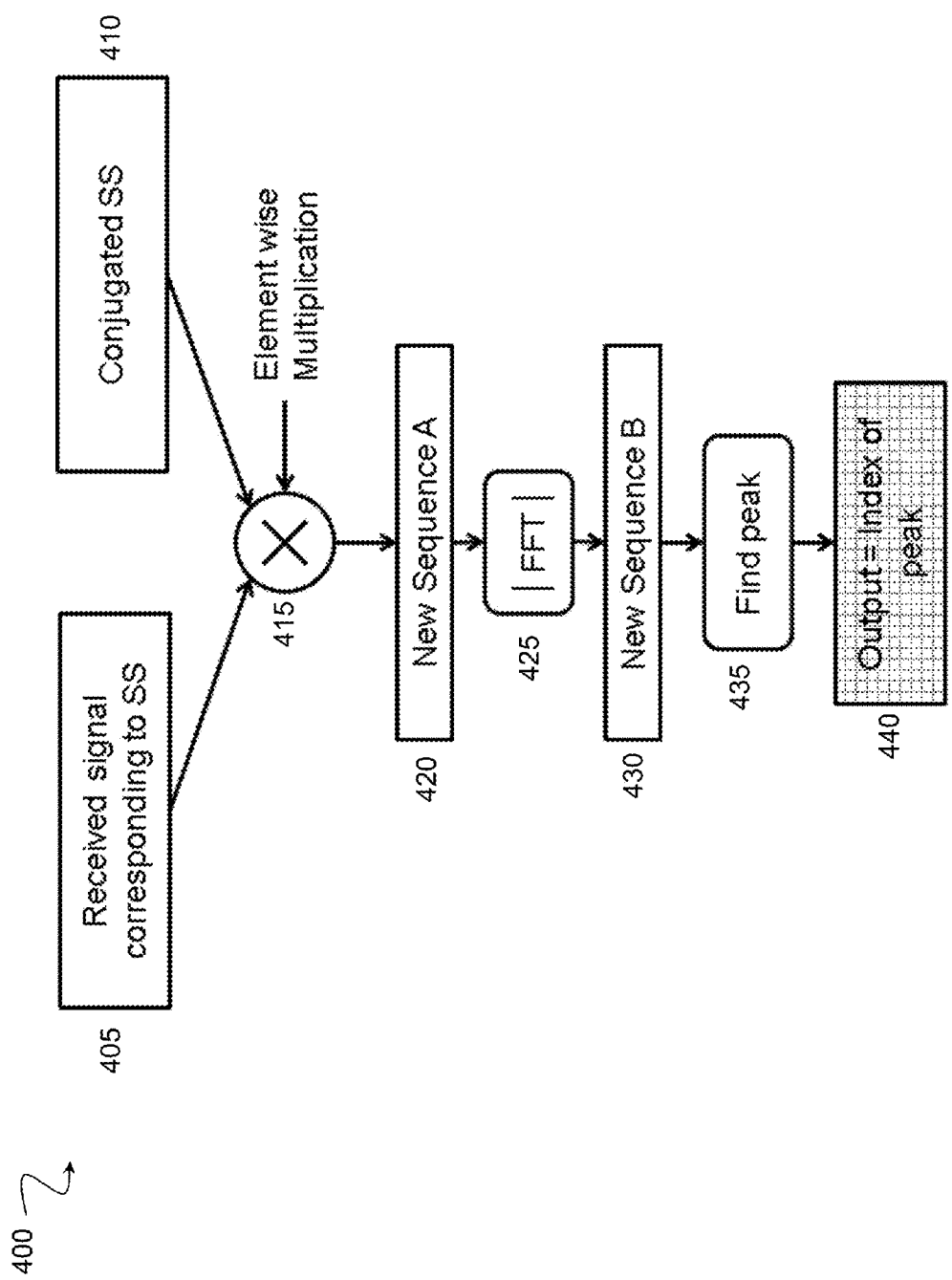
FIG. 4 is a flow diagram of a receiver algorithm for frequency offset estimation, in accordance with certain embodiments.

FIG. 4 is a flow diagram of a receiver algorithm 400 for frequency offset estimation, in accordance with certain embodiments. In certain embodiments, frequency offset estimation algorithm 400 relies on the fact that the cyclic auto-correlation of a Fourier transform of a constant amplitude sequence is a Kronecker delta function, which is non-zero at only one position and zero at all other positions. In NB M2M approaches targeted for MTC devices, the channel remains fairly static over the synchronization sequence and can be assumed to be fairly constant. Therefore, the received sequence is affected by a constant fading process, a frequency offset and additive noise. The frequency offset leads to a linearly increasing phase rotation of the transmitted sequence. If the noise is not very large, the cyclic cross-correlation of the Fourier transform between the transmitted SS and the received SS will be non-zero at the index corresponding to the frequency offset. This is because in the frequency domain, the frequency offset manifests itself as a cyclic shift of the frequency domain sequence. In general, the correlator output at the index corresponding to the frequency offset will be far from zero, while output at other indices will be closer to zero. If this characteristic is not detectable when processing a single frame, it will appear after accumulating multiple frames. For each correlation index, the correlator outputs for multiple frames can be combined by, for example, summing the absolute values of the correlator outputs.

An efficient implementation of the receiver processing algorithm is shown in FIG. 4. Generally, the idea is that the cross-correlation between the Fourier transforms of two sequences is equivalent to an element wise multiplication of the corresponding time domain sequences and taking the Fourier transform of the result. Block 405 shows the received signal corresponding to the SS. Block 410 shows the complex conjugate of the transmitted SS. At block 415, the received signal corresponding to the SS of block 405 is first multiplied element wise with the complex conjugate of the transmitted SS of block 410 to obtain New Sequence A at block 420. This is possible because after the frame timing has been estimated, the exact location of the SS can be found in the received signal. At block 425, the magnitude of the Fourier transform (FFT) of New Sequence A gives New Sequence B at block 430. The output of the algorithm at block 440 corresponds to the index of the maximum value of New Sequence B determined at block 435.

In alternative embodiments, the received signal corresponding to SS at block 405 is transformed into frequency domain with a Fourier transform, the transmitted SS at block 410 is transformed into frequency domain with a Fourier transform, and the two resulting frequency domain representations are correlated. After that, the correlation index corresponding to the highest peak is identified. This index corresponds to the frequency offset.

In bad or extended coverage scenarios, the time and frequency offset estimations uses accumulation of multiple frames to achieve sufficient accuracy. The use of a single sequence, the SS, may give the benefit of shorter synchronization time compared to existing approaches that use separate sequences for time offset estimation and frequency offset estimation. This is because using a single sequence for both purposes allows the signal to be longer in time. Thus, it can contain more energy or provide a higher processing gain per frame (or unit time), and fewer frames need to be accumulated in bad coverage.

In certain embodiments, the time and frequency offset estimates may be used to locate a cell ID signal time, to frequency correct it, and to detect the cell ID. The cell ID signal may be transmitted by the base station in each cell in each frame. In addition, the time and frequency offset estimates, and the detected cell ID, may be used to locate a frame ID signal in time, to frequency correct it, to descramble it, and to detect the frame ID. The frame ID signal is transmitted in each frame from the base station, and is scrambled with the cell ID.

As described above, certain of the embodiments described herein may have one or more advantages. For example, certain embodiments may allow for mitigating some of the problems associated with existing designs for cell search mechanisms in narrowband M2M systems. Compared to the existing designs, the new design described herein achieves faster synchronization, has lower complexity and storage requirements, and also enables support for more unique cell IDs, which was not possible to achieve simultaneously in the existing design.

One example of such an advantage is faster synchronization. Numerical evaluations show faster synchronization with the proposed solution, in both the single as well as the multi-cell setting, which is primarily because of using a longer sequence for both timing alignment as well as frequency offset correction. A longer sequence results in a lesser number of frames to be accumulated to give a desired accuracy, thereby shortening the synchronization procedure.

Another advantage of the various embodiments described herein is complexity reduction. According to existing approaches such as the one described in GP-140563, "NB M2M—Overview of the Physical Layer Design," there are 3 PSS and 12 SSS to be compared. Since no timing information is available in the first timing estimation step, a correlation window spanning a full frame needs to be used, which results in rather high complexity for the timing estimation. In GP-140563, the correlation needs to be performed separately for three different PSS, leading to a complexity increase. In addition, considering an oversampling factor of OS, which in GP-140563 was assumed to be 16, a total of 3×960×OS complex coefficients need to be stored (since every frame is composed of 960 symbols), for every possible combination of PSS index and time offset. In contrast, in the various embodiments described herein a single sequence is used, resulting in a reduction in a factor of 3 in terms of complexity, and also in terms of storage, since a storage of only 960×OS complex coefficients (for each possible time offset) is needed.

Similarly, in the second step, for GP-140563, a total of 12×257 complex coefficients need to be calculated, corresponding to every possible combination of SSS index and frequency offset index. However, according to certain example embodiments described herein, only 409 complex coefficients are required (for every frequency offset index), leading to savings in storage as well as computations. The new design also yields better frequency offset estimation accuracy due to the use of a longer sequence, which decreases the estimation error by increasing the estimation granularity. In certain embodiments, the symbols corresponding to frame number may be stored. This may allow detecting the frame number via knowledge of the cell ID and the cell specific scrambling sequence to be used for descrambling before the frame number detection algorithm is used. In certain embodiments, this may result in storing 127 symbols over 10 frames results in storing 1270 complex coefficients, which can be afforded by reusing the memory from the frame timing estimation process.

As yet another example, the various embodiments described herein may advantageously provide support for more cells. A major disadvantage of the existing design in GP-140563 is the support for a limited number of unique cell IDs. For example, only 36 cell IDs are supported, meaning a support for more cells would result in a reuse of the existing cell IDs. In order to support more cells with unique cell IDs, either the number of PSS or SSS needs to be increased, leading to an increase in complexity. As described above, in certain example embodiments 100 cells can be supported with unique cell IDs using length 101 Zadoff-Chu sequences. Since both time offset and frequency offset has already been determined, the receiver only needs to despread or correlate each sequence at a single time lag or index, and no full sliding correlation needs to be performed. So the complexity of detecting the 100 sequences is low. In conventional GSM standard, up to 96 cells are supported and since narrowband M2M approaches are expected to be deployed in the GSM band, the proposed solution offers the capability to support 96 cells or more.

It is to be noted that any feature of any of the above embodiments may be applied to any other embodiment, wherever appropriate. Likewise, any advantage of any of the embodiments may apply to the other embodiments, and vice versa. Other objectives, features and advantages of the enclosed embodiments will be apparent from the following detailed disclosure, attached claims, and drawings.

Figure 5:
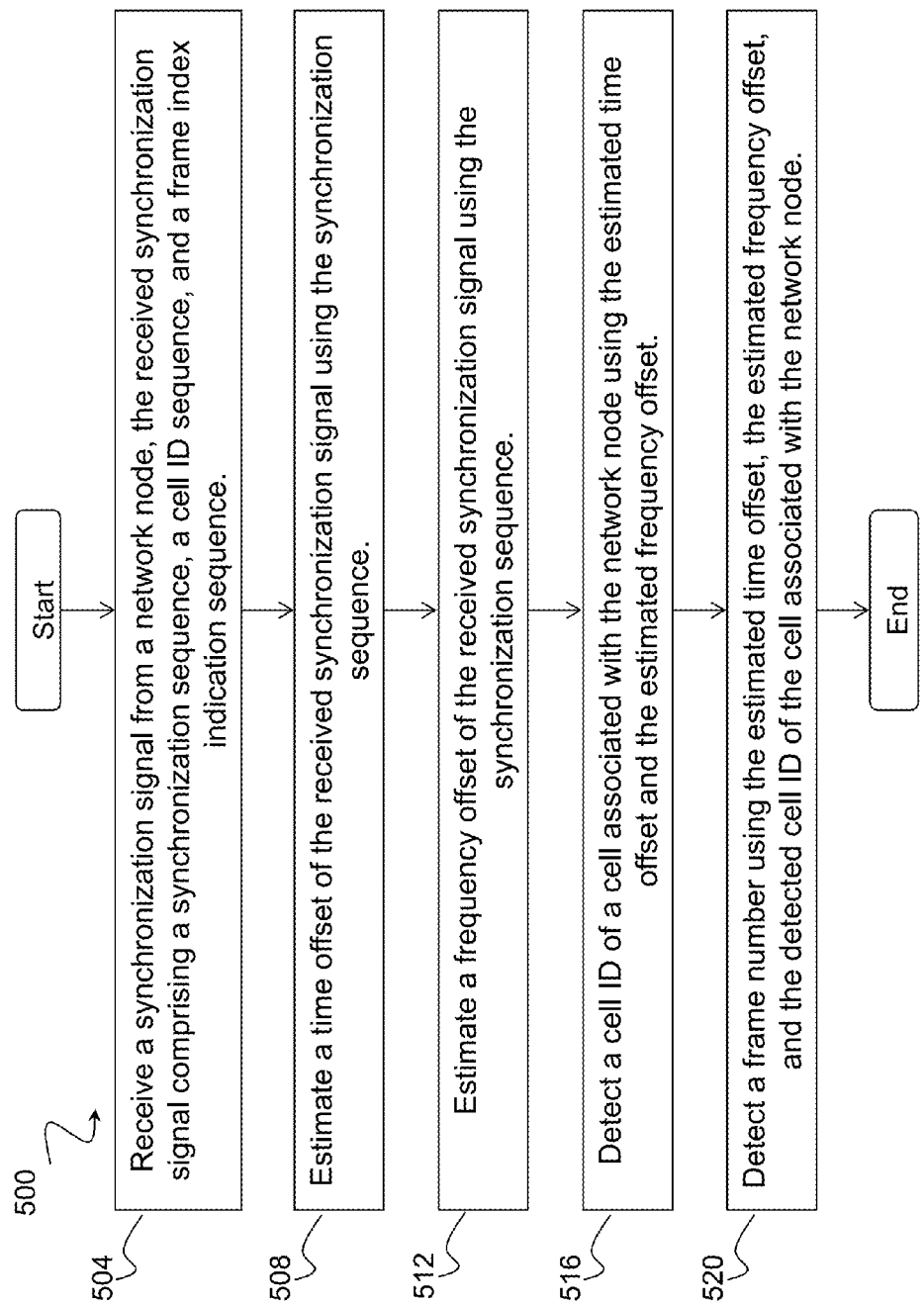
FIG. 5 is a flow diagram of a method in a first network node, in accordance with certain embodiments.

FIG. 5 is a flow diagram of a method 500 in a wireless device, in accordance with certain embodiments. The method begins at step 504, where the wireless device receives a synchronization signal from a network node, the received synchronization signal comprising a synchronization sequence, a cell ID sequence, and a frame index indication sequence.

In certain embodiments, the synchronization sequence may comprise a differentially encoded base sequence. The base sequence may comprise one of a Zadoff-Chu sequence, an m-sequence, and a gold sequence. In some cases, the synchronization sequence may comprise a BPSK modulated differentially encoded Zadoff-Chu sequence, the cell ID sequence may comprise a Zadoff-Chu sequence, and the frame index indication sequence may comprise a Zadoff-Chu sequence scrambled using a scrambling sequence specific for a particular cell. In one example embodiment, the synchronization sequence may have a symbol length of 410 symbols, the cell ID sequence may have a symbol length of 101 symbols, and the frame index indication sequence may have a symbol length of 127 symbols. In certain embodiments, the method further comprises accumulating multiple frames in order to estimate the time offset with at least a first threshold level of accuracy and to estimate the frequency offset with at least a second threshold level of accuracy.

At step 508, the wireless device estimates a time offset of the received synchronization signal using the synchronization sequence. At step 512, the wireless device estimates a frequency offset of the received synchronization signal using the synchronization sequence.

At step 516, the wireless device detects a cell ID of a cell associated with the network node using the estimated time offset and the estimated frequency offset. In certain embodiments, detecting the cell ID of the cell associated with the network node using the estimated time offset and the estimated frequency offset may comprise using the time offset estimated using the synchronization sequence to locate the cell ID sequence in time, using the frequency offset estimated using the synchronization sequence to frequency correct the located cell ID sequence, and detecting the cell ID of the cell associated with the network node (115).

At step 520, the wireless device detects a frame number using the estimated time offset, the estimated frequency offset, and the detected cell ID of the cell associated with the network node. In certain embodiments, detecting the frame number using the estimated time offset, the estimated frequency offset, and the detected cell ID of the cell associated with the network node may comprise using the time offset estimated using the synchronization sequence to locate the frame index indication sequence in time, and using the frequency offset estimated using the synchronization sequence to frequency correct the located frame index indication sequence in time. The method may further comprise descrambling the frame index indication sequence using the detected cell ID, and detecting a frame number based at least in part on the descrambled frame index indication sequence.

Figure 6:
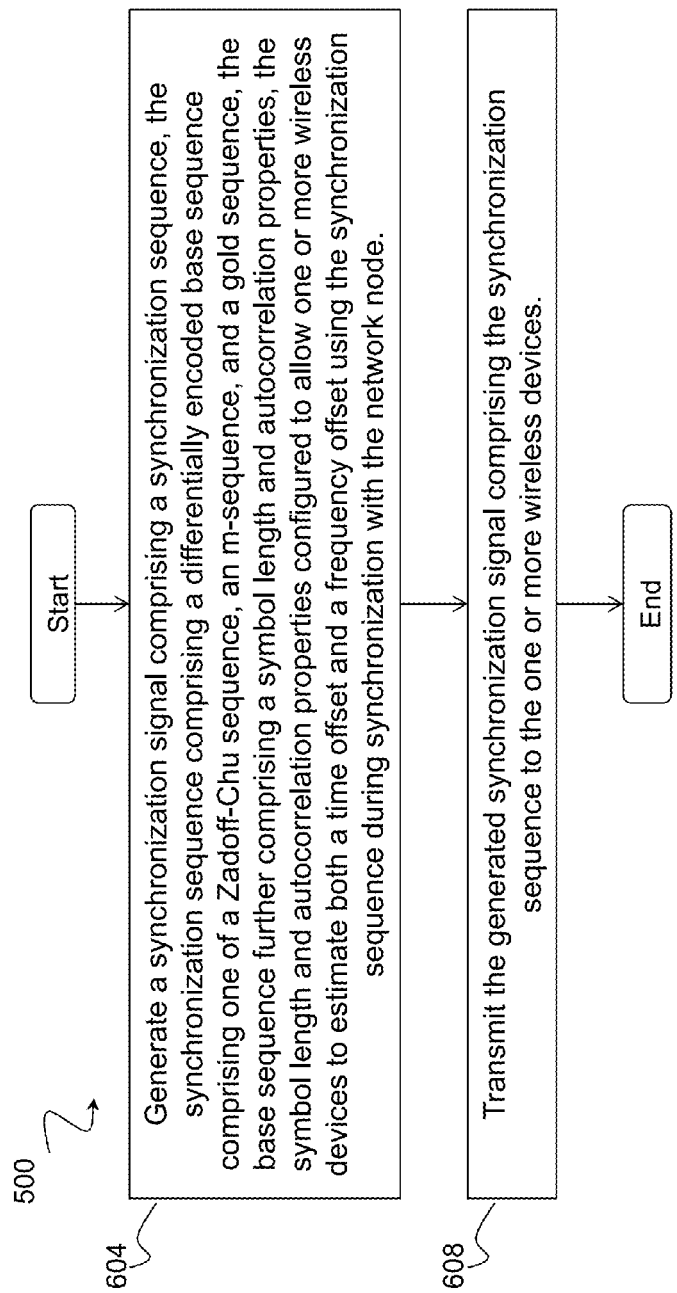
FIG. 6 is a flow diagram of a method in a wireless device, in accordance with certain embodiments.

FIG. 6 is a flow diagram of a method 600 in a network node, in accordance with certain embodiments. The method begins at step 604, where the network node generates a synchronization signal comprising a synchronization sequence, the synchronization sequence comprising a differentially encoded base sequence comprising one of a Zadoff-Chu sequence, an m-sequence, and a gold sequence. The base sequence further comprises a symbol length and autocorrelation properties, the symbol length and autocorrelation properties configured to allow one or more wireless devices to estimate both a time offset and a frequency offset using the synchronization sequence during synchronization with the network node.

In certain embodiments, the generated synchronization signal may further comprise a cell ID sequence and a frame index indication sequence. The cell ID sequence may be a sequence for determining a cell ID by the one or more wireless devices. The frame index indication sequence may be a sequence for determining a frame number by the one or more wireless devices. In some cases, the synchronization sequence may comprise a BPSK modulated differentially encoded Zadoff-Chu sequence, the cell ID sequence may comprise a Zadoff-Chu sequence, and the frame index indication sequence may comprise a Zadoff-Chu sequence scrambled using a scrambling sequence specific for a particular cell. As one example, the synchronization sequence may have a symbol length of 410 symbols, the cell ID sequence may have a symbol length of 101 symbols, and the frame index indication sequence may have a symbol length of 127 symbols.

At step 608, the network node transmits the generated synchronization signal comprising the synchronization sequence to the one or more wireless devices.

Figure 7:
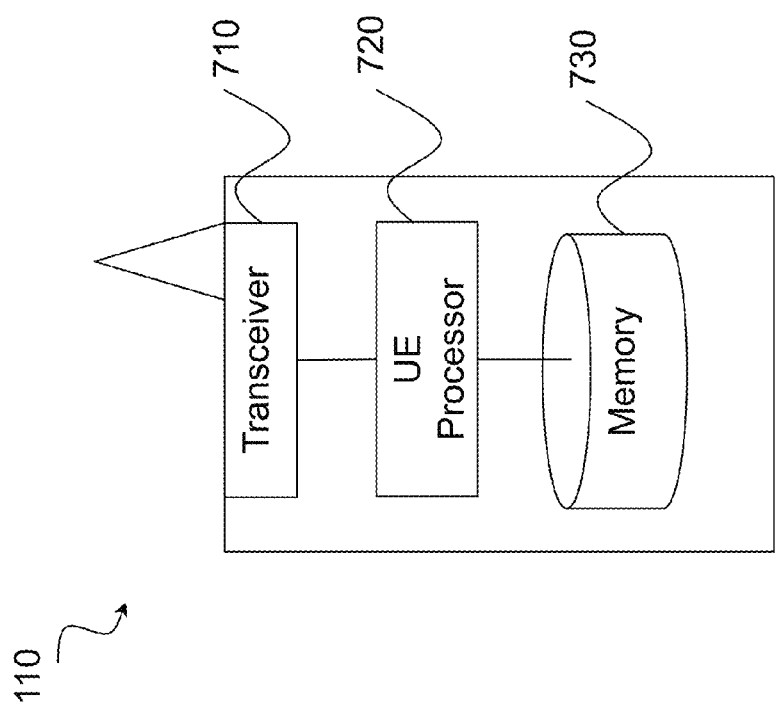
FIG. 7 is a block schematic of an exemplary wireless device, in accordance with certain embodiments.

FIG. 7 is a block schematic of an exemplary wireless device 110, in accordance with certain embodiments. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, a modem, a machine-type-communication (MTC) device/machine-to-machine (M2M) device, laptop embedded equipment (LEE), laptop mounted equipment (LME), USB dongles, a D2D capable device, or another device that can provide wireless communication. A wireless device 110 may also be referred to as UE, a station (STA), a device, or a terminal in some embodiments. Wireless device 110 includes transceiver 710, processor 720, and memory 730. In some embodiments, transceiver 710 facilitates transmitting wireless signals to and receiving wireless signals from network node 115 (e.g., via an antenna), processor 720 executes instructions to provide some or all of the functionality described above as being provided by wireless device 110, and memory 730 stores the instructions executed by processor 720.

Processor 720 may include any suitable combination of hardware and software implemented in one or more modules to execute instructions and manipulate data to perform some or all of the described functions of wireless device 110, such as the functions of wireless device 110 described above in relation to FIGS. 1-6. In some embodiments, processor 720 may include, for example, one or more computers, one or more central processing units (CPUs), one or more microprocessors, one or more applications, one or more application specific integrated circuits (ASICs), one or more field programmable gate arrays (FPGAs) and/or other logic.

Memory 730 is generally operable to store instructions, such as a computer program, software, an application including one or more of logic, rules, algorithms, code, tables, etc. and/or other instructions capable of being executed by a processor. Examples of memory 730 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by processor 720.

Other embodiments of wireless device 110 may include additional components beyond those shown in FIG. 7 that may be responsible for providing certain aspects of the wireless device's functionality, including any of the functionality described above and/or any additional functionality (including any functionality necessary to support the solution described above). As just one example, wireless device 110 may include input devices and circuits, output devices, and one or more synchronization units or circuits, which may be part of the processor 720. Input devices include mechanisms for entry of data into wireless device 110. For example, input devices may include input mechanisms, such as a microphone, input elements, a display, etc. Output devices may include mechanisms for outputting data in audio, video and/or hard copy format. For example, output devices may include a speaker, a display, etc.

Figure 8:
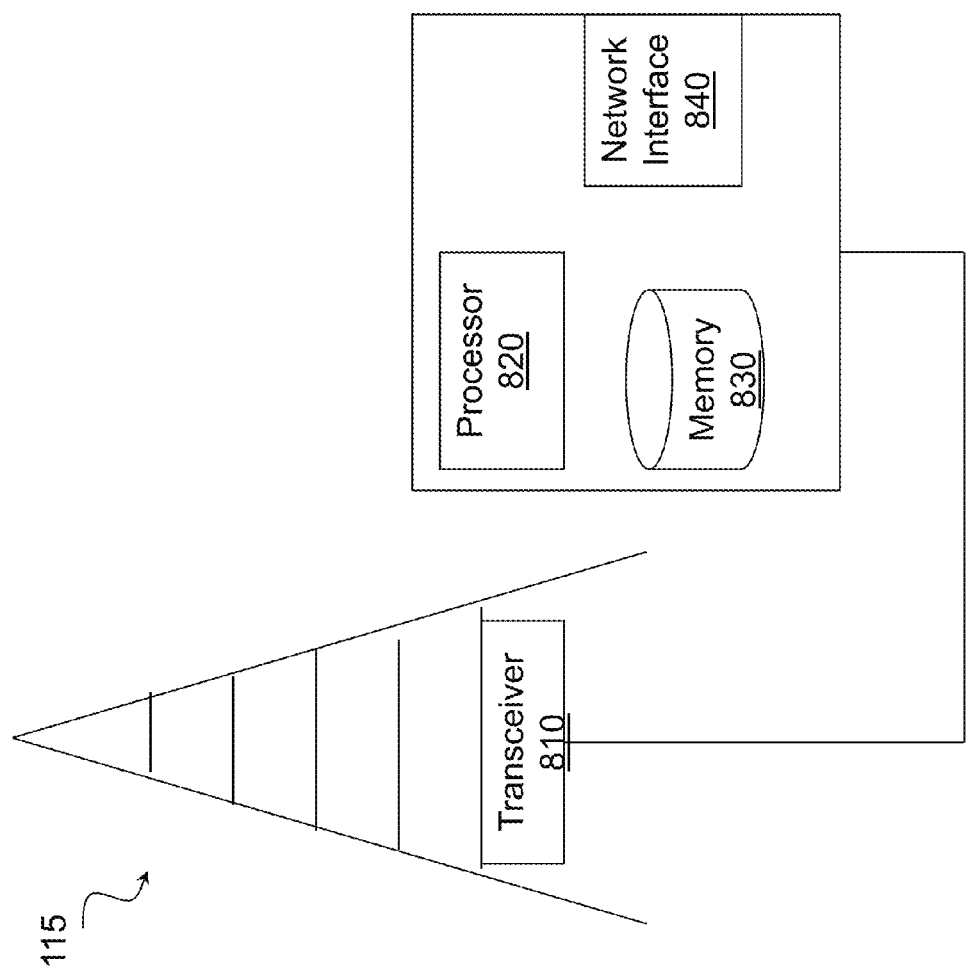
FIG. 8 is a block schematic of an exemplary network node, in accordance with certain embodiments.

FIG. 8 is a block schematic of an exemplary network node 115, in accordance with certain embodiments. Network node 115 may be any type of radio network node or any network node that communicates with a UE and/or with another network node. Examples of network node 115 include an eNodeB, a node B, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), O&M, OSS, SON, positioning node (e.g., E-SMLC), MDT, or any other suitable network node. Network nodes 115 may be deployed throughout network 100 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 810, processor 820, memory 830, and network interface 840. In some embodiments, transceiver 810 facilitates transmitting wireless signals to and receiving wireless signals from wireless device 110 (e.g., via an antenna), processor 820 executes instructions to provide some or all of the functionality described above as being provided by a network node 115, memory 830 stores the instructions executed by processor 820, and network interface 840 communicates signals to backend network components, such as a gateway, switch, router, Internet, Public Switched Telephone Network (PSTN), core network nodes or radio network controllers 130, etc.

Processor 820 may include any suitable combination of hardware and software implemented in one or more modules to execute instructions and manipulate data to perform some or all of the described functions of network node 115, such as those described above in relation to FIGS. 1-6 above. In some embodiments, processor 820 may include, for example, one or more computers, one or more central processing units (CPUs), one or more microprocessors, one or more applications, and/or other logic.

Memory 830 is generally operable to store instructions, such as a computer program, software, an application including one or more of logic, rules, algorithms, code, tables, etc. and/or other instructions capable of being executed by a processor. Examples of memory 830 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 840 is communicatively coupled to processor 820 and may refer to any suitable device operable to receive input for network node 115, send output from network node 115, perform suitable processing of the input or output or both, communicate to other devices, or any combination of the preceding. Network interface 840 may include appropriate hardware (e.g., port, modem, network interface card, etc.) and software, including protocol conversion and data processing capabilities, to communicate through a network.

Other embodiments of network node 115 may include additional components beyond those shown in FIG. 8 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 9:
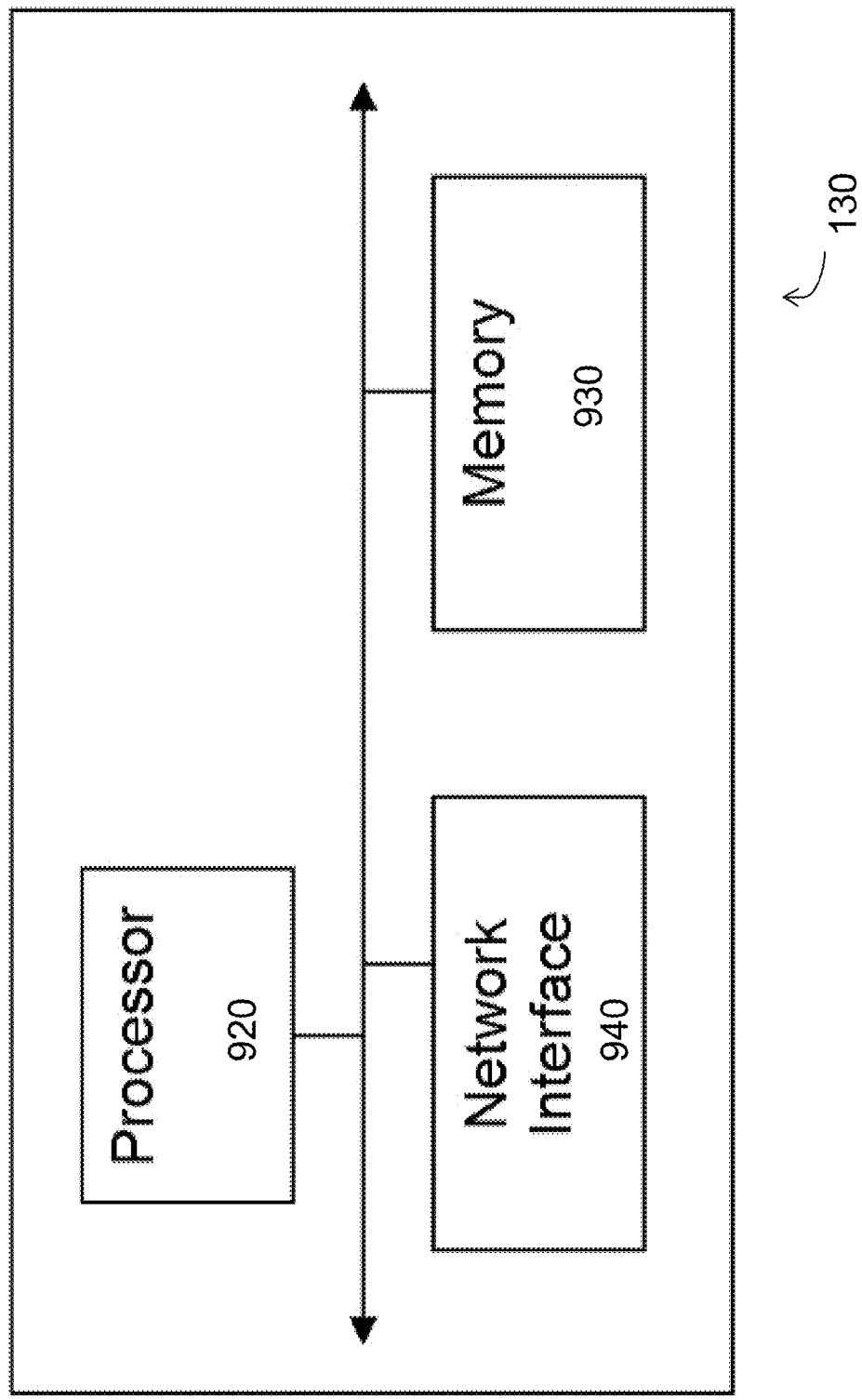
FIG. 9 is a block schematic of an exemplary radio network controller or core network node, in accordance with certain embodiments.

FIG. 9 is a block schematic of an exemplary radio network controller or core network node 130, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 130 includes processor 920, memory 930, and network interface 940. In some embodiments, processor 920 executes instructions to provide some or all of the functionality described above as being provided by the network node, memory 930 stores the instructions executed by processor 920, and network interface 940 communicates signals to any suitable node, such as a gateway, switch, router, Internet, Public Switched Telephone Network (PSTN), network nodes 115, radio network controllers or core network nodes 130, etc.

Processor 920 may include any suitable combination of hardware and software implemented in one or more modules to execute instructions and manipulate data to perform some or all of the described functions of the radio network controller or core network node 130. In some embodiments, processor 920 may include, for example, one or more computers, one or more central processing units (CPUs), one or more microprocessors, one or more applications, and/or other logic.

Memory 930 is generally operable to store instructions, such as a computer program, software, an application including one or more of logic, rules, algorithms, code, tables, etc. and/or other instructions capable of being executed by a processor. Examples of memory 930 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 940 is communicatively coupled to processor 920 and may refer to any suitable device operable to receive input for the network node, send output from the network node, perform suitable processing of the input or output or both, communicate to other devices, or any combination of the preceding. Network interface 940 may include appropriate hardware (e.g., port, modem, network interface card, etc.) and software, including protocol conversion and data processing capabilities, to communicate through a network.

Other embodiments of the network node may include additional components beyond those shown in FIG. 9 that may be responsible for providing certain aspects of the network node's functionality, including any of the functionality described above and/or any additional functionality (including any functionality necessary to support the solution described above).

Figure 10:
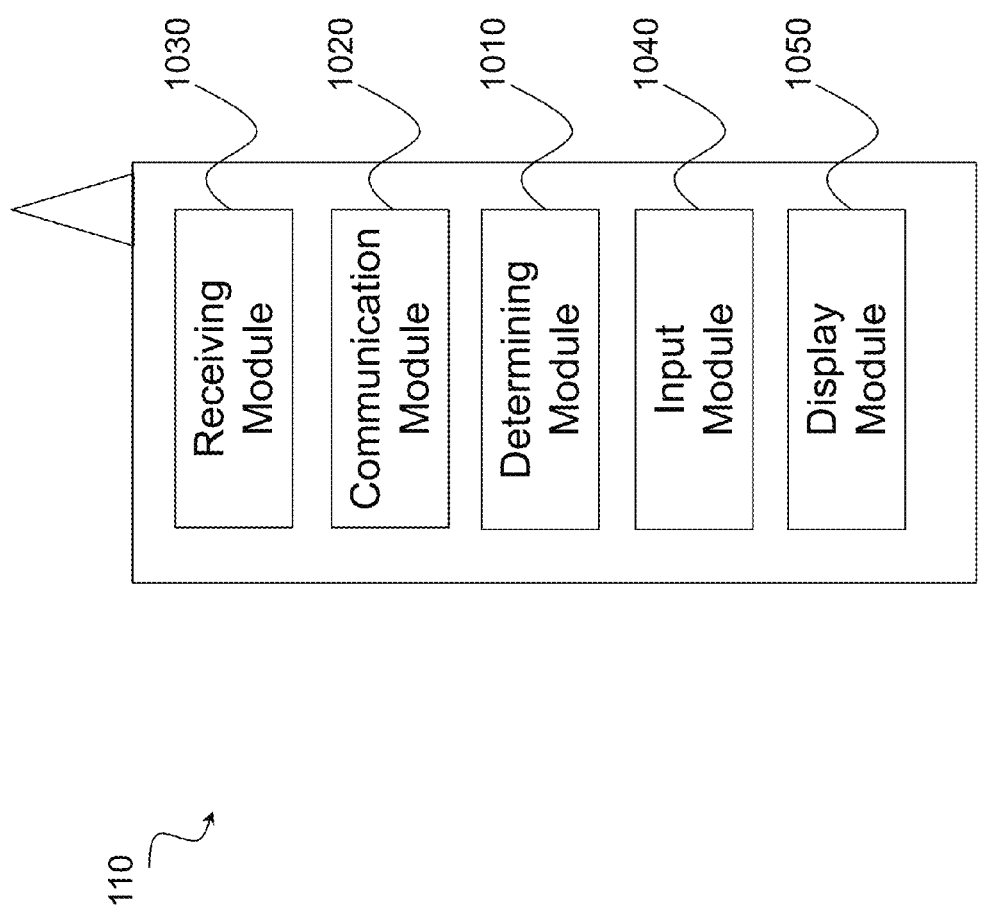
FIG. 10 is a block schematic of an exemplary wireless device, in accordance with certain embodiments.

FIG. 10 is a schematic block diagram of an exemplary wireless device, in accordance with certain embodiments. Wireless device 110 may include one or more modules. For example, wireless device 110 may include a determining module 1010, a communication module 1020, a receiver module 1030, an input module 1040, a display module 1050, and any other suitable modules.

Determining module 1010 may perform the processing functions of wireless device 110. For example, determining module 1010 may estimate a time offset of the received synchronization signal using the synchronization sequence, and estimate a frequency offset of the received synchronization signal using the synchronization sequence. As another example, determining module 1010 may detect a cell ID of a cell associated with a network node using the estimated time offset and the estimated frequency offset. As yet another example, determining module 1010 may detect a frame number using the estimated time offset, the estimated frequency offset, and the detected cell ID of the cell associated with the network node. Determining module 1010 may include or be included in one or more processors, such as processor 720 described above in relation to FIG. 7. Determining module 1010 may include analog and/or digital circuitry configured to perform any of the functions of determining module 1010 and/or processor 720 described above. The functions of determining module 1010 described above may, in certain embodiments, be performed in one or more distinct modules.

Communication module 1020 may perform the transmission functions of wireless device 110. Communication module 1020 may transmit messages to one or more of network nodes 115 of network 100. Communication module 1020 may include a transmitter and/or a transceiver, such as transceiver 710 described above in relation to FIG. 7.

Communication module 1020 may include circuitry configured to wirelessly transmit messages and/or signals. In particular embodiments, communication module 1020 may receive messages and/or signals for transmission from determining module 1010.

Receiving module 1030 may perform the receiving functions of wireless device 110. For example, receiving module 1030 may receive a synchronization signal from a network node, the received synchronization signal comprising a synchronization sequence, a cell ID sequence, and a frame index indication sequence. Receiving module 1030 may include a receiver and/or a transceiver. Receiving module 1030 may include circuitry configured to wirelessly receive messages and/or signals. In particular embodiments, receiving module 1030 may communicate received messages and/or signals to determining module 1010.

Input module 1040 may receive user input intended for wireless device 110. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to determining module 1010.

Display module 1050 may present signals on a display of wireless device 110. Display module 1050 may include the display and/or any appropriate circuitry and hardware configured to present signals on the display. Display module 1050 may receive signals to present on the display from determining module 1010.

Determining module 1010, communication module 1020, receiving module 1030, input module 1040, and display module 1050 may include any suitable configuration of hardware and/or software. Wireless device 110 may include additional modules beyond those shown in FIG. 10 that may be responsible for providing any suitable functionality, including any of the functionality described above and/or any additional functionality (including any functionality necessary to support the various solutions described herein).

Figure 11:
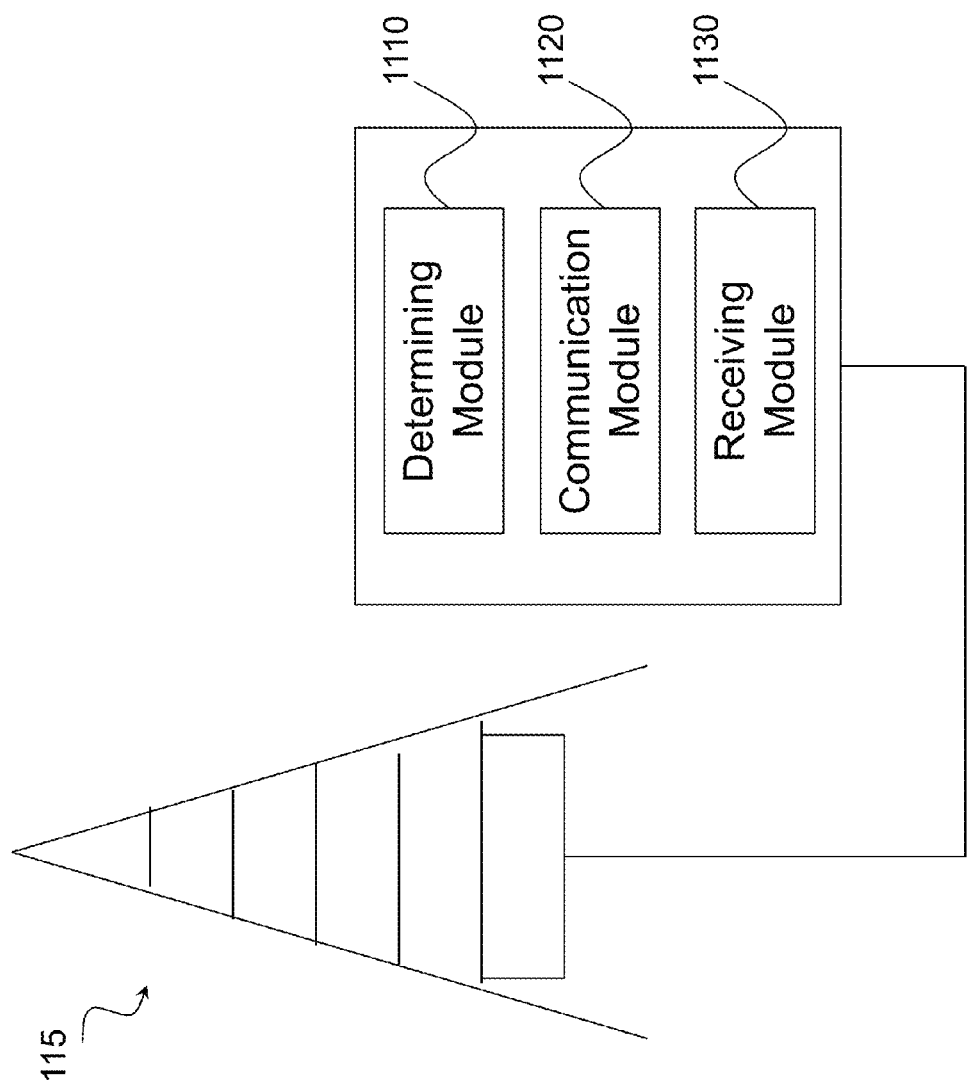
FIG. 11 is a block schematic of an exemplary network node, in accordance with certain embodiments.

FIG. 11 is a schematic block diagram of an exemplary network node 115, in accordance with certain embodiments. Network node 115 may include one or more modules. For example, network node 115 may include determining module 1110, communication module 1120, receiving module 1130, and any other suitable modules. In some embodiments, one or more of determining module 1110, communication module 1120, receiving module 1130, or any other suitable module may be implemented using one or more processors, such as processor 820 described above in relation to FIG. 8. In certain embodiments, the functions of two or more of the various modules may be combined into a single module.

Determining module 1110 may perform the processing functions of network node 115. As one example, determining module 1110 may generate a synchronization signal comprising a synchronization sequence, the synchronization sequence comprising a differentially encoded base sequence comprising one of a Zadoff-Chu sequence, an m-sequence, and a gold sequence, the base sequence further comprising a symbol length and autocorrelation properties, the symbol length and autocorrelation properties configured to allow one or more wireless devices to estimate both a time offset and a frequency offset using the synchronization sequence during synchronization with the network node. Determining module 1110 may include or be included in one or more processors, such as processor 820 described above in relation to FIG. 8. Determining module 1110 may include analog and/or digital circuitry configured to perform any of the functions of determining module 1110 and/or processor 820 described above. The functions of determining module 1110 may, in certain embodiments, be performed in one or more distinct modules.

Communication module 1120 may perform the transmission functions of network node 115. As one example, communication module 1120 may transmit the generated synchronization signal comprising the synchronization sequence to the one or more wireless devices. Communication module 1120 may transmit messages to one or more of wireless devices 110. Communication module 1120 may include a transmitter and/or a transceiver, such as transceiver 810 described above in relation to FIG. 8. Communication module 1120 may include circuitry configured to wirelessly transmit messages and/or signals. In particular embodiments, communication module 1120 may receive messages and/or signals for transmission from determining module 1110 or any other module.

Receiving module 1130 may perform the receiving functions of network node 115. Receiving module 1130 may receive any suitable information from a wireless device. Receiving module 1130 may include a receiver and/or a transceiver. Receiving module 1130 may include circuitry configured to wirelessly receive messages and/or signals. In particular embodiments, receiving module 1130 may communicate received messages and/or signals to determining module 1110 or any other suitable module.

Determining module 1110, communication module 1120, and receiving module 1130 may include any suitable configuration of hardware and/or software. Network node 115 may include additional modules beyond those shown in FIG. 11 that may be responsible for providing any suitable functionality, including any of the functionality described above and/or any additional functionality (including any functionality necessary to support the various solutions described herein).

Figure 12:
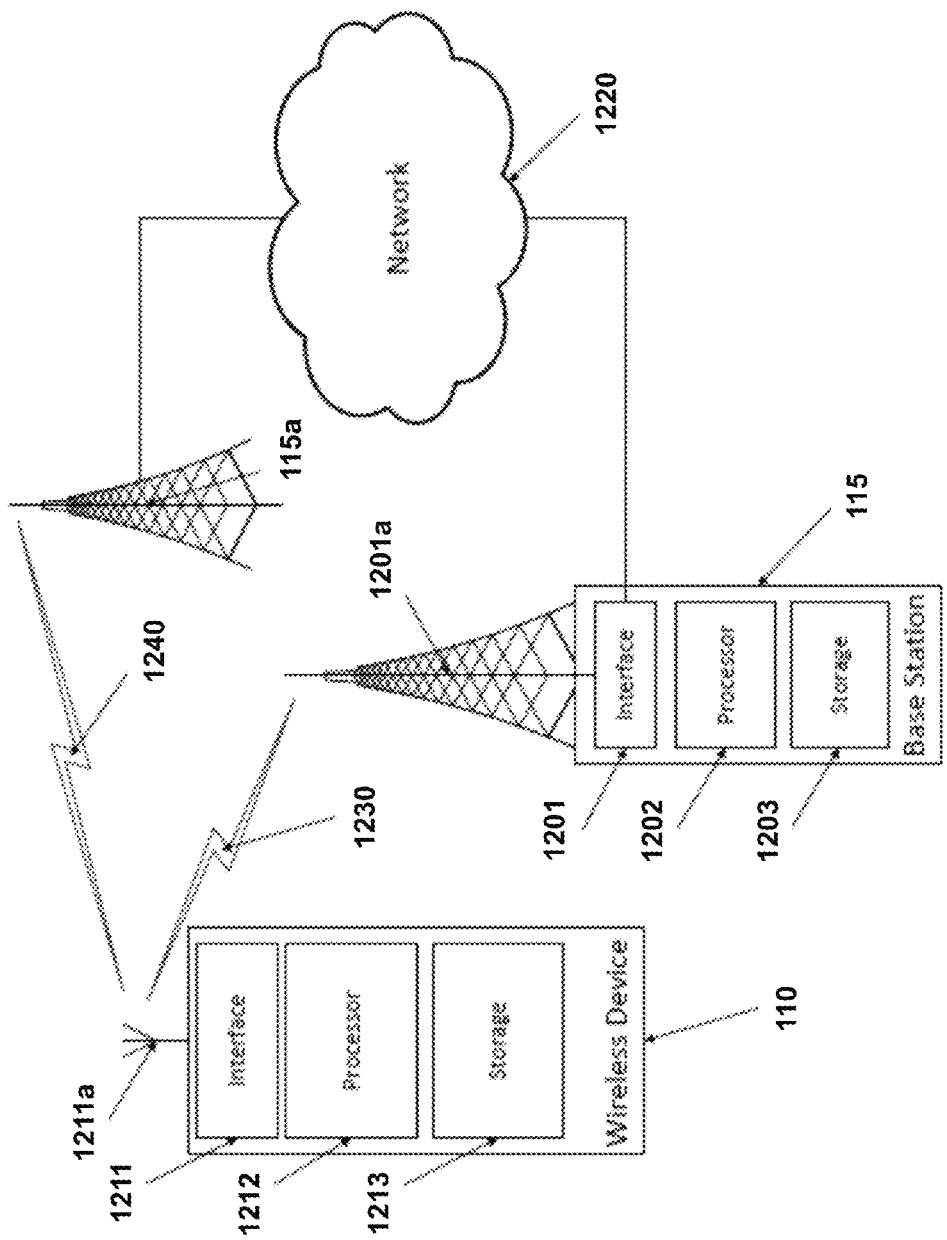
FIG. 12 is a block diagram illustrating an embodiment of a wireless communication network, in accordance with certain embodiments.

FIG. 12 is a block diagram illustrating an embodiment of a wireless communication network, in accordance with certain embodiments. More particularly, FIG. 12 illustrates a more detailed view of network node 115 and wireless device 110. For simplicity, FIG. 12 depicts network 1220, network nodes 115 and 115a, and wireless device 110. Network node 115 comprises processor 1202, storage 1203, interface 1201, and antenna 1201a. Similarly, wireless device 110 comprises processor 1212, storage 1213, interface 1211 and antenna 1211a. These components may work together in order to provide network node and/or wireless device functionality, such as providing wireless connections in a wireless network and allowing for a change in estimated DL CC. For example, wireless device 110 (including processor 1212, storage 1213, interface 1211, and antenna 1211a) and network nodes 115 and/or 115a (including processor 1202, storage 1203, interface 1201, and antenna 1201a) may perform some or all of the described functions of wireless device 110 and network node 115 described above in relation to FIGS. 1-6. In different embodiments, the wireless network may comprise any number of wired or wireless networks, network nodes, base stations, controllers, wireless devices, relay stations, and/or any other components that may facilitate or participate in the communication of data and/or signals whether via wired or wireless connections.

Network 1220 may comprise one or more IP networks, public switched telephone networks (PSTNs), packet data networks, optical networks, wide area networks (WANs), local area networks (LANs), wireless local area networks (WLANs), wired networks, wireless networks, metropolitan area networks, and other networks to enable communication between devices.

Network node 115 comprises processor 1202, storage 1203, interface 1201, and antenna 1201*a*. These components are depicted as single boxes located within a single larger box. In practice however, network node 115 may comprise multiple different physical components that make up a single illustrated component (e.g., interface 1201 may comprise terminals for coupling wires for a wired connection and a radio transceiver for a wireless connection). Similarly, network node 115 may be composed of multiple physically separate components (e.g., a NodeB component and a RNC component, a BTS component and a BSC component, etc.), which may each have their own respective processor, storage, and interface components. In certain scenarios in which network node 115 comprises multiple separate components (e.g., BTS and BSC components), one or more of the separate components may be shared among several network nodes. For example, a single RNC may control multiple NodeB's. In such a scenario, each unique NodeB and BSC pair, may be a separate network node. In some embodiments, network node 115 may be configured to support multiple radio access technologies (RATs). In such embodiments, some components may be duplicated (e.g., separate storage 1203 for the different RATs) and some components may be reused (e.g., the same antenna 1201*a* may be shared by the RATs).

Processor 1202 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other network node 115 components, such as storage 1203, network node 115 functionality. For example, processor 1202 may execute instructions stored in storage 1203. Such functionality may include providing various wireless features discussed herein to a wireless devices, such as wireless device 110, including any of the features or benefits disclosed herein.

Storage 1203 may comprise any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. Storage 1203 may store any suitable instructions, data or information, including software and encoded logic, utilized by network node 115. Storage 1203 may be used to store any calculations made by processor 1202 and/or any data received via interface 1201.

Network node 115 also comprises interface 1201 which may be used in the wired or wireless communication of signaling and/or data between network node 115, network 1220, and/or wireless device 1210. For example, interface 1201 may perform any formatting, coding, or translating that may be needed to allow network node 115 to send and receive data from network 1220 over a wired connection. Interface 1201 may also include a radio transmitter and/or receiver that may be coupled to or a part of antenna 1201*a*. The radio may receive digital data that is to be sent out to other network nodes or wireless devices via a wireless connection. The radio may convert the digital data into a radio signal having the appropriate channel and bandwidth parameters. The radio signal may then be transmitted via antenna 1201*a* to the appropriate recipient (e.g., wireless device 110).

Antenna 1201*a* may be any type of antenna capable of transmitting and receiving data and/or signals wirelessly. In some embodiments, antenna 1201*a* may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

Wireless device 110 may be any type of wireless endpoint, mobile station, mobile phone, wireless local loop phone, smartphone, user equipment, desktop computer, PDA, cell phone, tablet, laptop, VoIP phone or handset, which is able to wirelessly send and receive data and/or signals to and from a network node, such as network node 115 and/or other wireless devices. Wireless device 110 comprises processor 1212, storage 1213, interface 1211, and antenna 1211*a*. Like network node 115, the components of wireless device 110 are depicted as single boxes located within a single larger box, however in practice a wireless device may comprises multiple different physical components that make up a single illustrated component (e.g., storage 1213 may comprise multiple discrete microchips, each microchip representing a portion of the total storage capacity).

Processor 1212 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in combination with other wireless device 110 components, such as storage 1213, wireless device 110 functionality. Such functionality may include providing various wireless features discussed herein, including any of the features or benefits disclosed herein.

Storage 1213 may be any form of volatile or non-volatile memory including, without limitation, persistent storage, solid state memory, remotely mounted memory, magnetic media, optical media, random access memory (RAM), read-only memory (ROM), removable media, or any other suitable local or remote memory component. Storage 1213 may store any suitable data, instructions, or information, including software and encoded logic, utilized by wireless device 110. Storage 1213 may be used to store any calculations made by processor 1212 and/or any data received via interface 1211.

Interface 1211 may be used in the wireless communication of signaling and/or data between wireless device 110 and network node 115. For example, interface 1211 may perform any formatting, coding, or translating that may be needed to allow wireless device 110 to send and receive data from network node 115 over a wireless connection. Interface 1211 may also include a radio transmitter and/or receiver that may be coupled to or a part of antenna 1211*a*. The radio may receive digital data that is to be sent out to network node 115 via a wireless connection. The radio may convert the digital data into a radio signal having the appropriate channel and bandwidth parameters. The radio signal may then be transmitted via antenna 1211*a* to network node 115.

Antenna 1211*a* may be any type of antenna capable of transmitting and receiving data and/or signals wirelessly. In some embodiments, antenna 1211*a* may comprise one or more omni-directional, sector or panel antennas operable to transmit/receive radio signals between 2 GHz and 66 GHz. For simplicity, antenna 1211a may be considered a part of interface 1211 to the extent that a wireless signal is being used.

In some embodiments, the components described above may be used to implement one or more functional modules used in narrowband mobile-to-mobile cell search. The functional modules may comprise software, computer programs, sub-routines, libraries, source code, or any other form of executable instructions that are run by, for example, a processor. In general terms, each functional module may be implemented in hardware and/or in software. Preferably, one or more or all functional modules may be implemented by processors 1212 and/or 1202, possibly in cooperation with storage 1213 and/or 1203. Processors 1212 and/or 1202 and storage 1213 and/or 1203 may thus be arranged to allow processors 1212 and/or 1202 to fetch instructions from storage 1213 and/or 1203 and execute the fetched instructions to allow the respective functional module to perform any features or functions disclosed herein. The modules may further be configured to perform other functions or steps not explicitly described herein but which would be within the knowledge of a person skilled in the art.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order. Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
PSS Primary Synchronization Sequence
SSS Secondary Synchronization Sequence
FIIS Frame Index Indication Sequence
CIS Cell Identification Sequence
SS Synchronization Sequence
BIB Broadcast Information Block
NB M2M Narrowband Machine-to-Machine
ID Identification
GSM Global System for Mobile Communications
EDGE Enhanced Data Rates for GSM Evolution
GERAN GSM EDGE Radio Access Network
MHz Mega Hertz
Hz Hertz
kHz kilo Hertz
TU Typical Urban
MTC Machine Type Communications
3GPP Third Generation Partnership Project
PBSCH Physical Broadcast Synchronization Channel
FDM Frequency Division Multiplexing
BPSK Binary Phase Shift Keying
FFT Fast Fourier Transform

The invention claimed is:

1. A method in a network node, comprising:
generating a synchronization signal comprising a synchronization sequence, the synchronization sequence comprising a differentially encoded base sequence comprising one of a Zadoff-Chu sequence, an m-sequence, and a gold sequence, the base sequence further comprising a symbol length and autocorrelation properties, the symbol length and autocorrelation properties configured to allow one or more wireless devices to estimate both a time offset and a frequency offset using the synchronization sequence during synchronization with the network node; and
transmitting the generated synchronization signal comprising the synchronization sequence to the one or more wireless devices;
wherein the generated synchronization signal further comprises a cell ID sequence and a frame index indication sequence, and wherein:
the cell ID sequence comprises a sequence for determining a cell ID by the one or more wireless devices; and
the frame index indication sequence comprises a sequence for determining a frame number by the one or more wireless devices;
wherein the synchronization sequence comprises a BPSK modulated differentially encoded Zadoff-Chu sequence;
wherein the cell ID sequence comprises a Zadoff-Chu sequence; and
wherein the frame index indication sequence comprises a Zadoff-Chu sequence scrambled using a scrambling sequence specific for a particular cell.

2. The method of claim 1, wherein:
the synchronization sequence has a symbol length of 410 symbols;
the cell ID sequence has a symbol length of 101 symbols; and
the frame index indication sequence has a symbol length of 127 symbols.

3. A method in a wireless device, comprising:
receiving a synchronization signal from a network node, the received synchronization signal comprising a synchronization sequence, a cell ID sequence, and a frame index indication sequence;
estimating a time offset of the received synchronization signal using the synchronization sequence;
estimating a frequency offset of the received synchronization signal using the synchronization sequence;
detecting a cell ID of a cell associated with the network node using the estimated time offset and the estimated frequency offset; and
detecting a frame number using the estimated time offset, the estimated frequency offset, and the detected cell ID of the cell associated with the network node.

4. The method of claim 3, further comprising accumulating multiple frames in order to estimate the time offset with at least a first threshold level of accuracy and to estimate the frequency offset with at least a second threshold level of accuracy.

5. The method of claim 3, wherein detecting the cell ID of the cell associated with the network node using the estimated time offset and the estimated frequency offset comprises:
   using the time offset estimated using the synchronization sequence to locate the cell ID sequence in time;
   using the frequency offset estimated using the synchronization sequence to frequency correct the located cell ID sequence; and
   detecting the cell ID of the cell associated with the network node.

6. The method of claim 3, wherein detecting the frame number using the estimated time offset, the estimated frequency offset, and the detected cell ID of the cell associated with the network node comprises:
   using the time offset estimated using the synchronization sequence to locate the frame index indication sequence in time;
   using the frequency offset estimated using the synchronization sequence to frequency correct the located frame index indication sequence in time;
   descrambling the frame index indication sequence using the detected cell ID; and
   detecting a frame number based at least in part on the descrambled frame index indication sequence.

7. The method of claim 3, wherein the synchronization sequence comprises a differentially encoded base sequence.

8. The method of claim 7, wherein the base sequence comprises one of:
   a Zadoff-Chu sequence;
   an m-sequence; and
   a gold sequence.

9. The method of claim 3, wherein:
   the synchronization sequence comprises a BPSK modulated differentially encoded Zadoff-Chu sequence;
   the cell ID sequence comprises a Zadoff-Chu sequence; and
   the frame index indication sequence comprises a Zadoff-Chu sequence scrambled using a scrambling sequence specific for a particular cell.

10. The method of claim 9, wherein:
    the synchronization sequence has a symbol length of 410 symbols;
    the cell ID sequence has a symbol length of 101 symbols; and
    the frame index indication sequence has a symbol length of 127 symbols.

11. A network node, comprising:
    one or more processors, the one or more processors configured to:
    generate a synchronization signal comprising a synchronization sequence, the synchronization sequence comprising a differentially encoded base sequence comprising one of a Zadoff-Chu sequence, an m-sequence, and a gold sequence, the base sequence further comprising a symbol length and autocorrelation properties, the symbol length and autocorrelation properties configured to allow one or more wireless devices to estimate both a time offset and a frequency offset using the synchronization sequence during synchronization with the network node; and
    transmit the generated synchronization signal comprising the synchronization sequence to the one or more wireless devices;
    wherein the generated synchronization signal further comprises a cell ID sequence and a frame index indication sequence, and wherein:
    the cell ID sequence comprises a sequence for determining a cell ID by the one or more wireless devices; and
    the frame index indication sequence comprises a sequence for determining a frame number by the one or more wireless devices;
    wherein the synchronization sequence comprises a BPSK modulated differentially encoded Zadoff-Chu sequence;
    wherein the cell ID sequence comprises a Zadoff-Chu sequence; and
    wherein the frame index indication sequence comprises a Zadoff-Chu sequence scrambled using a scrambling sequence specific for a particular cell.

12. The network node of claim 11, wherein:
    the synchronization sequence has a symbol length of 410 symbols;
    the cell ID sequence has a symbol length of 101 symbols; and
    the frame index indication sequence has a symbol length of 127 symbols.

13. A wireless device, comprising:
    one or more processors, the one or more processors configured to:
    receive a synchronization signal from a network node, the received synchronization signal comprising a synchronization sequence, a cell ID sequence, and a frame index indication sequence;
    estimate a time offset of the received synchronization signal using the synchronization sequence;
    estimate a frequency offset of the received synchronization signal using the synchronization sequence;
    detect a cell ID of a cell associated with the network node using the estimated time offset and the estimated frequency offset; and
    detect a frame number using the estimated time offset, the estimated frequency offset, and the detected cell ID of the cell associated with the network node.

14. The wireless device of claim 13, wherein the one or more processors are further configured to accumulate multiple frames in order to estimate the time offset with at least a first threshold level of accuracy and to estimate the frequency offset with at least a second threshold level of accuracy.

15. The wireless device of claim 13, wherein the one or more processors are further configured to:
    use the time offset estimated using the synchronization sequence to locate the cell ID sequence in time;
    use the frequency offset estimated using the synchronization sequence to frequency correct the located cell ID sequence; and
    detect the cell ID of the cell associated with the network node.

16. The wireless device of claim 13, wherein the one or more processors are further configured to:
    use the time offset estimated using the synchronization sequence to locate the frame index indication sequence in time;
    use the frequency offset estimated using the synchronization sequence to frequency correct the located frame index indication sequence in time;

descramble the frame index indication sequence using the detected cell ID; and detect a frame number based at least in part on the descrambled frame index indication sequence.

17. The wireless device of claim 13, wherein the synchronization sequence comprises a differentially encoded base sequence.

18. The wireless device of claim 17, wherein the base sequence comprises one of:
a Zadoff-Chu sequence;
an m-sequence; and
a gold sequence.

19. The wireless device of claim 13, wherein:
the synchronization sequence comprises a BPSK modulated differentially encoded Zadoff-Chu sequence;
the cell ID sequence comprises a Zadoff-Chu sequence; and
the frame index indication sequence comprises a Zadoff-Chu sequence scrambled using a scrambling sequence specific for a particular cell.

20. The wireless device of claim 19, wherein:
the synchronization sequence has a symbol length of 410 symbols;
the cell ID sequence has a symbol length of 101 symbols; and
the frame index indication sequence has a symbol length of 127 symbols.

\* \* \* \* \*